US006625092B2

(12) United States Patent
Tanoue et al.

(10) Patent No.: US 6,625,092 B2
(45) Date of Patent: *Sep. 23, 2003

(54) RECORDING/REPRODUCING OPTICAL DISK WITH ZIG-ZAG SHIFT HEADERS AND RECORDING/REPRODUCING APPARATUS USING SAME

(75) Inventors: Koki Tanoue, Yokohama (JP); Hideaki Osawa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/891,289

(22) Filed: Jun. 27, 2001

(65) Prior Publication Data

US 2002/0027858 A1 Mar. 7, 2002

Related U.S. Application Data

(62) Division of application No. 09/097,386, filed on Jun. 16, 1998, now Pat. No. 6,259,658.

(30) Foreign Application Priority Data

Jul. 4, 1997 (JP) .............................. 9-179380
Jun. 16, 1997 (JP) .............................. 9-157260
Jun. 16, 1997 (JP) .............................. 9-157261

(51) Int. Cl.[7] ................................. G11B 7/00
(52) U.S. Cl. .................. 369/44.26; 369/275.3
(58) Field of Search .................. 369/44.13, 44.29, 369/44.28, 44.27, 44.26, 44.35, 47.49, 47.54, 47.55, 275.3, 275.4

(56) References Cited

U.S. PATENT DOCUMENTS 5,892,740 A * 4/1999 Nagasawa et al. ....... 369/275.3
6,044,051 A * 3/2000 Miyagawa et al. ...... 369/47.19
6,236,637 B1 * 5/2001 Nagasawa et al. ....... 369/275.3

FOREIGN PATENT DOCUMENTS

| DE | 196 48 692 | 5/1997 |
| GB | 2 307 770 | 6/1997 |
| GB | 2 311 644 | 10/1997 |
| GB | 2 312 320 | 10/1997 |
| JP | 9-282669 | 10/1997 |
| JP | 10-11759 | 1/1998 |
| JP | 10-11763 | 1/1998 |
| JP | 10-106800 | 4/1998 |
| WO | WO 96/25736 | 8/1996 |

OTHER PUBLICATIONS

K. Nakane, M. Nagasawa, H. Oohata, M. Shimamoto, K. Komawaki, K, Gotoh, Technical Report of IEICE, MR95–88, "Access Method for Single–Spiral Land/Groove Recording Disc", vol. 95, No. 548, Feb. 29, 1996, pp. 29–34.

* cited by examiner

Primary Examiner—Paul W. Huber
(74) Attorney, Agent, or Firm—Pillsbury Winthrop LLP

(57) ABSTRACT

A recording/reproducing optical disk of the present invention comprises a first recording section formed on a spiral track in an area in the shape of a land, a second recording section formed on the spiral track in an area in the shape of a groove, the second recording section being adjacent to the first recording section, a first half header section in which first address information of the first recording section is recorded, and a second half header section, in which second address information of the second recording section is recorded, and which is disposed in pair with the first half header section in a zig-zag shifted manner, wherein the first half header section and the second half header section are located ahead of the first recording section to assume a first positional relation relatively to the first recording section and the first half header section and the second half header section are located ahead of the second recording section to assume a second positional relation other than the first positional relation relatively to the second recording section.

20 Claims, 8 Drawing Sheets

FIG. 3A

| | RECORDING FIELD | | | | | | | | |
|---|---|---|---|---|---|---|---|---|---|
| HEADER FIELD | MIRROR FIELD | GAP FIELD | GUARD 1 FIELD | VFO 3 FIELD | PS FIELD | DATA FIELD | PA3 FIELD | GUARD 2 FIELD | BUFFER FIELD |
| 128 | 2 | 10+J/16 | 20+K | 35 | 3 | 2418 | 1 | 55−K | 25−J/16 |

| HEADER 1 FIELD | | | | | | HEADER 2 FIELD | | | | | | HEADER 3 FIELD | | | | | | HEADER 4 FIELD | | | | | |
|---|---|---|---|---|---|---|---|---|---|---|---|---|---|---|---|---|---|---|---|---|---|---|---|
| VFO 1 | AM | PID 1 | IED 1 | PA1 | | VFO 2 | AM | PID 2 | IED 2 | PA2 | | VFO 1 | AM | PID 3 | IED 3 | PA1 | | VFO 2 | AM | PID 4 | IED 4 | PA2 | |
| 36 | 3 | 4 | 2 | 1 | | 8 | 3 | 4 | 2 | 1 | | 36 | 3 | 4 | 2 | 1 | | 8 | 3 | 4 | 2 | 1 | |

# RECORDING/REPRODUCING OPTICAL DISK WITH ZIG-ZAG SHIFT HEADERS AND RECORDING/REPRODUCING APPARATUS USING SAME

This is a division of application Ser. No. 09/097,386, filed Jun. 16, 1998, now U.S. Pat. No. 6,259,658.

BACKGROUND OF THE INVENTION

The present invention relates to a recording/reproducing optical disk, in which data recording/reproduction can be conducted by use of a sector disposed along a spiral track as a unit, and to an optical disk reproducing apparatus for data recording/reproducing on the optical disk.

Heretofore, rewritable optical disks available on the market have included optical disks having diameters of 120 mm and 90 mm and phase change disk of 120 mm in diameter (popular as PD).

These disks comprise guiding grooves for laser light illumination. Tracking is carried out by analyzing laser light based on the guiding grooves. The guiding grooves are formed as a continuous spiral which runs from the inner side of the disk to the outer side thereof. Heretofore, the guiding grooves each are referred to simply as "a groove" and a portion other than the grooves are referred to as "a land." In a conventional optical disk, information has been recorded either in a groove or on a land.

Such information on an optical disk is read and written for example, in 512 bytes or 2048 bytes as a unit. This information unit is called "a sector." In this sector, a sector address which indicates a location of the sector is assigned and formatting is conducted according a predetermined sector format in order to record information to a target address and to reproduce the information with high reliability. In the formatting, information on a sector is recorded by forming a recess/protrusion profile called "a pit" at a head of the sector. This portion in which the sector address information is recorded is called "a header." In a conventional optical disk, as described above, since information has been recorded in either a groove or a land, the header must be either in a groove for groove recording, or on a land for land recording.

While a conventional optical disk has recorded information either in a groove or on a land as described above, the recording capacity of the disk can easily be increased if information is recorded on both the groove and the land.

However, a problem arises regarding formatting the sector address in a manner such that information can be recorded in both the land and the groove.

In a conventional optical disk provided with a spiral groove as described above, the groove and the land are formed parallel to each other, hereinafter referred to as a double spiral structure.

In a double spiral structure, since grooves and lands are formed in parallel to each other, travel from a groove to a land requires a track jump. Therefore, whenever recording/reproducing of information is switched from a groove to a land and vice versa, a track jump or a seek is necessary, thereby making continuous recording/reproducing of information difficult.

Additionally, the only way to manufacture a disk in the double spiral format, is to separately format a sector in a groove (hereinafter referred to as groove sector) and another sector on a land (hereinafter referred to as land sector). Thus, it becomes difficult to format a disk, for example by a zone CAV format, so that recording/producing of information can alternately be conducted on a land or in a groove adjacent to each other.

That is, in order for a land and a groove adjacent to each other, to have sector addresses numbered in a continuous manner, either the grooves or lands must be independently formatted, while being separately assigned with addresses in an intermittent manner. In this case, unless travel from a land to a groove or vice versa is smoothly performed, disk rotational delay time occurs, which causes a problem of interference with realization of continuous recording/reproducing of information.

In addition, its desirable to achieve as much distance between pits in a header as possible in order to perform a more stable reading of the header.

BRIEF SUMMARY OF THE INVENTION

It is an object of the present invention to provide an optical disk information medium with higher reliability in reading a header and detecting a switch-over position between a land and a groove in a stabilized manner. Such an optical disk can be provided by disposing header areas on the optical disk in a zig-zag shifted manner using an optical disk fabricating apparatus for the same medium.

The present invention is directed to a data recording/reproducing optical disk comprising: a first recording section RF1, RF3, RF2, RF4, which is an area in the shape of a land formed on a spiral track, and in which data recording/reproducing is conducted; a second recording section RF5, RF7, RF6, RF8 adjacent to the first recording section, which is an area in the shape of a groove formed on the spiral track, and in which data recording/reproducing is conducted. Also provided is a first half header section HF1, HF3, in which first address information corresponding to the first recording section is recorded; and a second half header section HF2, HF4, in which second address information corresponding to the second recording section is recorded, and which is disposed in a zig-zag shifted manner in pair with the first half header section. The first half header section, e.g. HF1, and the second half header section, e.g. HF4, are located ahead of the first recording sections e.g. RF2. Additionally, both half header sections are located to assume a first positional relation relatively to the first recording section and when the first half header section, e.g. HF1, and the second half header section, e.g. HF2, are located ahead of the second recording section e.g. RF5, both half header sections are located to assume a second positional relation other than the first positional relation relative to the second recording section.

The present invention has a configuration in which the first half header section HF1, HF3 and the second half headers HF2, HF4 are disposed in a zig-zag shifted manner with a space therebetween as shown in FIG. 1A and therefore 1) reliability in reading is increased because a margin in distance between adjacent pits is provided, 2) a narrow beam exclusively used for a header is not necessary any longer and thus cutting can be possible by one beam with a high speed and 3) a switch-over position between a land and a groove can be detected with ease.

That is, according to a structure A as shown in FIG. 7, since there is no blank in a header section 103 lying between recording sections 101 and 105, a distance between pits is smaller and thereby creates the possibility of an error reading the error in data.

On the other hand, according to a structure C of the present invention, since a blank is provided, a sufficient margin is available in distance between pits, hereby reliability in address reading can be improved.

For this reason, since a cutting process also has a sufficient margin in distance between pits according to an embodiment of the present invention, one beam can commonly be used for cutting of recording and address sections and both cuttings are thereby conducted in one operation. Therefore, there is no requirement for having a beam uses exclusively for cutting a header, as is in the case of the structure A. Thus, a speedy cutting process can be realized.

In an optical disk having such a double spiral structure as used in the present invention, there is a necessity for detection of switch-over in tracking polarity between land and groove areas. A positional relation of the headers located in the zig-zag shifted manner, that is, wobbling of each header, can be used for detection of switch-over timing. That is, a photodetector cell, which analyzes a reflecting light from a disk, outputs a first signal A corresponding to the outer side of a recording track and a second signal B corresponding to the inner side thereof, and in addition detects the difference between the signals as (A–B). The signal difference (A–B) assumes (A–B)>0 for a header which wobbles to the outer side, that is a positive sign [+] and on the other hand the difference assumes (A–B)<0 for a header which wobbles to the inner side, that is a positive sign [–]. With detection of the signal change in a header, a polarity change in signal of [–] to [+] (FIG. 8A) can determine that the header comes ahead of a recording section of the land sector and the polarity change in signal of [+] to [–] (FIG. 8B) can tell that the header comes head of a recording section of the group sector.

In addition, another embodiment of the present invention is directed to a data recording/reproducing optical disk comprising: a plurality of land sectors RF1, RF2, RF3, RF4, HF1, HF3, wherein a predetermined number of land sectors are disposed on a spiral track on a disk along one track round and the land sector is an area in the shape of a land where data recording/reproducing is conducted and disposed on the spiral track. The land sector includes a first recording section RF1, RF2, RF3, RF4 and a first half header section HF1, HF3, which indicates address information of the first recording section, and which is located ahead of the first recording section. A plurality of groove sectors RF5, RF6, RF7, RF8, HF2, HF4 is included, wherein a predetermined number of groove sectors are disposed on a spiral track on the disk along one track round. The predetermined number of groove sectors are disposed in parallel to the predetermined number of land sectors in an alternate manner. The plurality of groove sectors and the plurality of land sectors are disposed on tracks alternately continuously in a radial direction, one round of land sectors and one round of groove sectors being directly adjacent to each other. Additionally, a groove sector is an area in the shape of a groove where data recording/reproducing is conducted and disposed on the spiral track. The groove sector includes: a second recording section RF5, RF6, RF7, RF8 and a second half header section HF2, HF4, which has address information of the second recording section, and which is disposed ahead of the second recording section in a zig-zag shifted manner in pair with the first header section.

It is understood that in the present embodiment, the optical disk has a feature wherein a land area and a groove area are alternately disposed on the disk in a radial direction and thus a continuous recording area is provided. This feature is included in addition to the plurality of headers having a configuration in a zig-zag shifted manner.

In such a structure, improvement on reading reliability, speedy cutting with one kind of beam and easy detection of switch-over positions between land and groove sectors can be realized.

In yet another embodiment, the present invention is directed to a data recording/reproducing optical disk recording/reproducing apparatus using a data recording/reproducing optical disk comprising: a first recording section RF1, RF3, RF2, RF4, which is an area in the shape of a land formed on a spiral track, and in which data recording/reproducing is conducted. A second recording section RF5, RF7, RF6, RF8 adjacent to the first recording section is also provided, which is an area in the shape of a groove formed on a spiral track, and in which data recording/reproducing is conducted. A first half header section HF1, HF3, in which first address information corresponding to the first recording section is recorded; and a second half header section HF2, HF4, in which second address information corresponding to the second recording section is recorded, and which is disposed in a zig-zag shifted manner in pair with the first half header section, are included. The first half header section, e.g. HF1 and the second half header section e.g. HF4, are located ahead of the first recording sections e.g. RF2. Both half header sections are located to assume a first positional relation relative to the first recording section, and when the first half header section, e.g. HF1, and the second half header section, e.g. HF2, are located ahead of the second recording section e.g. RF5, both half header sections are located to assume a second positional relation other than the first positional relation relative to the second recording section. The apparatus comprises: light illuminating means for illuminating the first half header sections, the second half header section, the first recording section and the second recording second section with a light beam. Next, the apparatus includes control means for controlling an illuminating position of the light beam based on a change in characteristics of reflecting light of the light beam from the illuminating means in order to direct the light beam to a predetermined position on the optical disk. Finally included, are and data recording/reproducing means for detecting a switch-over position between the first recording section and the second recording section based on a reflecting light reflected from the first half header section and the second half header section produced by illumination of the light beam from the illuminating means and executing data recording/reproducing on the optical disk based on the detection of the switch-over position.

The present invention, as described above, is to provide with a data recording/reproducing optical disk recording/reproducing apparatus which executes read/write of data on the data recording/reproducing disk, and which has headers disposed in a zig-zag shifted manner. Thus, a switch-over position between a land section and a groove section can be reliably detected by detecting the wobble of each of the headers.

Furthermore, in a final embodiment of the present invention a data recording/reproducing optical disk recording/reproducing apparatus is provided, wherein a light beam is intentionally shifted toward the inner side of the optical disk by a predetermined deviation from the center of a track.

With use of the apparatus, a light beam spot can be traced in a condition that the light beam spot is maintained in the same track and not only when switch-over of tracking polarity is not conducted but even when switch-over of tracking polarity is not successfully conducted, normal tracking control can be assured without any radical deviation therefrom.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A is a representation showing the entire structure of a sector on a recording/reproducing optical disk pertaining to an embodiment of the present invention;

FIG. 3B is a representation in a more detailed manner showing a header section of the sector of FIG. 3A;

DETAILED DESCRIPTION OF THE INVENTION

Embodiments of the invention of the present application will be described in reference to the accompanying drawings below.

Figure 1A:
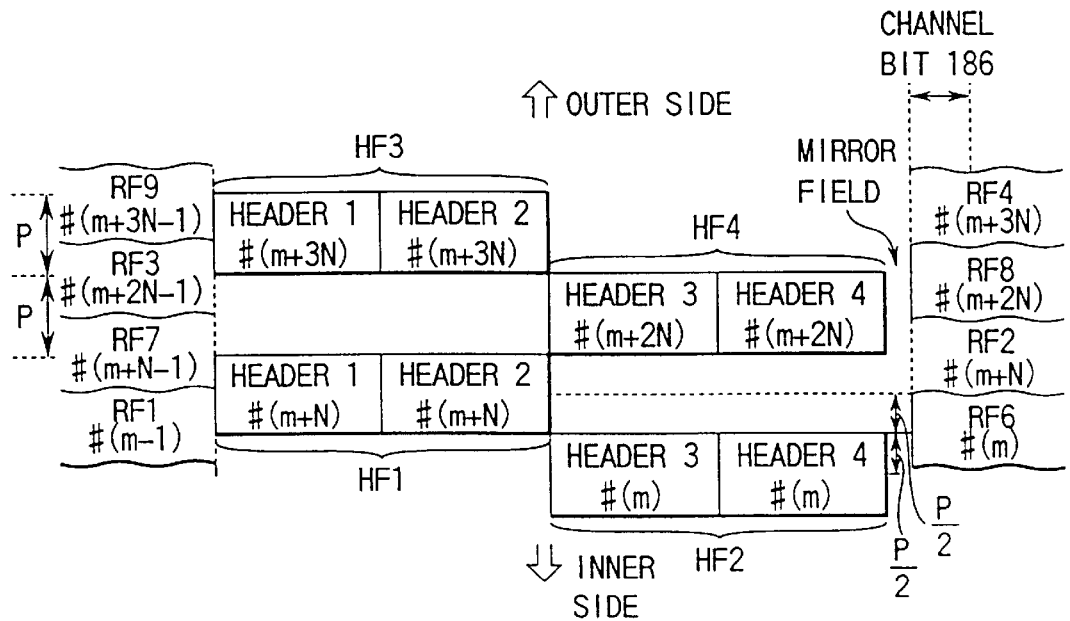
FIGS. 1A and 1B are representations as models illustrating headers in sectors of a recording/reproducing optical disk pertaining to an embodiment of the present invention.
Figure 1B:
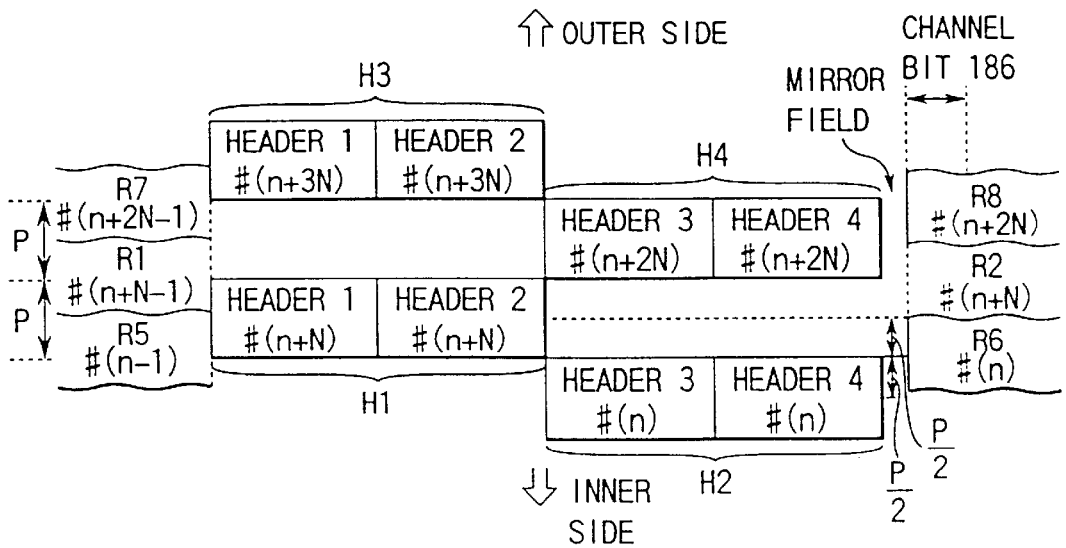

FIGS. 1A and 1B show headers in sectors of a recording/reproducing optical disk pertaining to an embodiment of the present invention.

An optical disk having header sections shown in FIGS. 1 and 1B changes a tracking polarity alternatively in the order of land, groove, land and groove between successive rounds without track jumping when tracing a spiral track.

FIG. 1A shows header sections in sectors in switch-over conditions of a tracking polarity. A sector in a switch-over condition of a tracking polarity is hereinafter referred to as first sector in the rest of the specification. FIG. 1B shows the structure of header sections in sectors other than the first sector. In a structure in which groove and land sectors are switched over to each other between successive rounds, there is a necessity for switching a track polarity to select a sector between groove and land sectors in tracking. A configuration of sectors in a switch-over condition assumes a different header configuration from the other sectors.

A header section shown by Header 1, Header 2, Header 3 and Header 4 is an area where a recess/protrusion profile called a "bit" is formed and address information on a sector is recorded by the recess/protrusion profile. Information recording areas indicated by RF1 to RF8 and R1 to R8 are areas made of, for example a recording film of a phase change type and hereinafter referred to as "a recording section." In the case of a phase change recording film, a difference in reflectance caused by a change in an optical property between a crystalline state and an amorphous state of the recording film is utilized by a user for recording and reproducing information. RF5 to RF8 and R5 to R8 in the recording section each indicate a recording section for a sector in which a guide groove is formed and hereinafter referred to as recording section of a groove sector. On the other hand, RF1 to RF4 and R1 and R2 each indicate a recording section of a sector provided in a portion which is not a guide groove, and which is adjacent to a groove sector, and hereinafter referred to as recording section of a land sector.

In FIGS. 1A and 1B, an arrow with OUTER SIDE drawn in the upper side points to the outer side of a disk and an arrow with INNER SIDE drawn in the lower side points to the inner side of the disk. Therefore, a direction of the upper to lower side or vice versa corresponds to a radial direction. Besides, #(m+N), #(n+N) and the like are sector numbers indicating sector addresses, wherein m and n indicate integers and N indicates the number of sectors along one round of a track, for example the number may be a predetermined integer falling in the range of 17 to 40.

Description on FIG. 1A will be given in a more detailed manner. In FIG. 1A, shown is a first sector on 4 tracks having sector numbers #m, #(m+N), #(m+2N) and #(m+3N). A header section in the first sector is formed by cutting in a quadruple write structure. Portions of a quadruply written header section respectively correspond to Header 1, Header 2, Header 3 and Header 4. Header 1 and Header 2 constitute first half header sections and Header 3 and Header 4 constitute second half header sections. The first half header sections are used as header sections for a land sector and the second half header sections are used as header sections for a groove sector.

Further description on FIG. 1A will be continued in a concrete manner. For a recording section RF6 of a groove sector #(m) whose address is indicated by a sector number #(m), a second half header section HF2, which is provided at a head portion of the recording section RF6 with a Mirror Field (hereinafter referred to as mirror section) being inserted therebetween, is used as a header section of the sector. In this case, the second half header section HF2 comprises Header 3 and Header 4 in which address information of the sector number #{m) is recorded. The second half header section HF2 is shifted by a half of a track pitch toward the inner side relative to a position where the recording section RF6 of the groove sector #(m) is formed, that is, the second half header section HF2 is parallel-translated sideways for displacement. The track pitch is a distance between centers of a land and a groove which are adjacent to each other, which is a distance shown by a mark P in FIG. 1A.

For a recording section RF2 of a land sector #(m+N) whose address is indicated by a sector number #(m+N), a first half header section HF1, which is provided at a forward position of the recording section RF2 with not only a mirror section but also a space corresponding to the second half header section HF2 inserted therebetween, is used as a header section of the sector. In this case, the first half header section HF1 comprises Header 1 and Header 2, in which address information of the sector number #(m+N) is recorded. That is, the first half header section HF1 shows address information which is different from address information shown by the second half header section by one round of a track and to be more precise, the first half header section HF1 shows address information which is different from the second half header section HF2 by one round of a track toward the outer side. The first half header section HF1 is formed at a position which is shifted by a half of a track pitch toward the inner side relative to a position where the recording section RF2 of the land sector #(m+N) is located.

In this case, the recording section RF2 of the land sector #(m+N) is formed in an adjacent manner to the recording section RF6 of the groove sector #(m). That is, the recording section RF2 of the land sector #(m+N) is formed at a position toward the outer side relatively to the recording section RF6 of the groove sector #(m) by one track pitch. Thus, the first header section HF1 is formed toward the outer side relatively to the second header section HF2 by one track pitch. The first header section HF1 and the second header section HF 2 may be fabricated in a continuous manner by cutting described later and Header 2 in the first header section HF1 and Header 3 in the second header section HF2 are located in a adjacent manner. With such a configuration, the first header section HF1 and the second header section HF2 constitute a zig-zag shift structure of headers as a pair.

A recording section RF1 of a land sector #(m−1) whose address is indicated by a sector number by one preceding the sector number #(m) for the recording section RF6 in the groove sector #(m) is fabricated on the same track as the recording section RF6 of the groove sector #(m) with a space occupied by the first half header section HF1 interposing between the recording section RF1 and the head portion of the second half header section HF2 which is a header section of the group sector #(m), that is a Header 3 portion. In a similar manner to this, a recording section RF5 of a groove sector #(m+N−1) whose address is indicated by a address number preceding the sector number #(m+N) for the recording section RF2 in the land sector #(m+N) is fabricated on the same track as the recording section RF2 in the land sector #(m+N) in an adjacent manner to the head portion of the first half header section HF1 which is a header section of the land sector #(m+N), that is in adjacent manner to a Header 1 portion.

Then FIG. 1B will be described below. In FIG. 1B, shown are sectors including three tracks of sector numbers of #n, #(n+N) and #(n+2N). A header section in the sector is formed in a similar manner to in the case of the first sector by cutting described later in a quadruple write structure. Portions of a quadruply written header section are respectively called as Header 1, Header 2, Header 3 and Header 4. In a similar manner, Header 1 and Header 2 constitute a first half header used as a header section of the land sectors and Header 3 and Header 4 constitute a second half header section used as a header section of the groove sectors.

Further description will be continued in a concrete manner. For a recording section R6 of a groove sector #(n) whose address is indicated by a sector number #(n), a second half header section H2, which is provided at a head portion of the recording section R6 with a mirror section being inserted therebetween, is used as a header section of the sector. In this case, the second half header section H2 comprises Header 3 and Header 4 in which address information of the sector number #(n) is recorded. The second half header section H2 is shifted by a half of a track pitch toward the inner side relative to a position where the recording section R6 of the groove sector #(n) is formed, that is the second half header section H2 is parallel-translated sideways for displacement.

For a recording section R2 of a land sector #(n+N) whose address is indicated by a sector number #(n+N), a first half header section Hi, which is provided at a forward position of the recording section R2 with not only a mirror section but in addition a space corresponding to the second header section H2 inserted therebetween, is used as a header section of the sector. In this case, the first half header section H1 comprises Header 1 and Header 2, in which address information of the sector number #(n+N) is recorded. The first half header section H1 is formed at a position which is shifted by a half of a track pitch toward the inner side relatively to a position where the recording section R2 of the land sector #(n+N) is located.

In this case, the recording section R2 of the land sector #(n+N) is formed in an adjacent manner to the recording section R6 of the groove sector #(n). That is, the recording section R2 of the land sector #(n+N) is formed at a position toward the outer side relatively to the recording section R6 of the groove sector #(n) by one track pitch. Thus, the first header section H1 is formed toward the outer side relatively to the second half header section H2 by one track pitch. The first half header section H1 and the second half header section H2 are fabricated in a continuous manner by cutting described later and Header 2 in the first half header section H1 and Header 3 in the second header section H2 are located in a adjacent manner. With such a configuration, the first half header section H1 and the second header section H2 constitute a zig-zag shift structure of headers.

A sector whose address is indicated by a sector number by one younger than the sector number #(n) for the recording section R6 in the groove sector #(n) is a groove sector #(n−1), which is different from the case of the first sector. A recording section R5 of the groove sector #(n−1) is fabricated on the same track as the recording section R6 of the groove sector #(n) with a space occupied by the first half header section H1 interposing between the recording section R5 and the head portion of the second half header section H2 which is a header section of the groove sector #(n). In a similar manner, a sector whose address is indicated by an address number by one younger than the sector number #(n+N) for the recording section R2 in the land sector #(n+N) is a land sector #(n+N−1). A recording sector R1 of the land sector #(n+N−1) is fabricated on the same track as the recording section R2 in the land sector #(n+N) in an adjacent manner to the head portion of the first half header section H1 which is a header section of the land sector #(n+N).

Fabrication of a recording/reproducing optical disk having the structure described above will be described.

When an optical disk is fabricated, a master disk having a recess/protrusion profile including grooves and pits is first of all fabricated by a method called cutting. The recess/protrusion profile formed on the master disk is transferred to a stamper and with use of the stamper as a die, a resin molding transferred with the profile is fabricated. This resin molding is used a substrate for the optical disk and a recording film such as a phase change type film is formed on a profiled surface of the substrate by a method such as a vapor deposition method or the like. Then, a protective film for protecting the recording film is formed by a method such as coating. In such a manner, fabrication of an optical disk having grooves and pits is conducted. It is also possible to fabricate a bonding type optical disk by bonding the above mentioned optical disks with each other with an intermediate layer made of a material similar to the protective layer.

Figure 2:
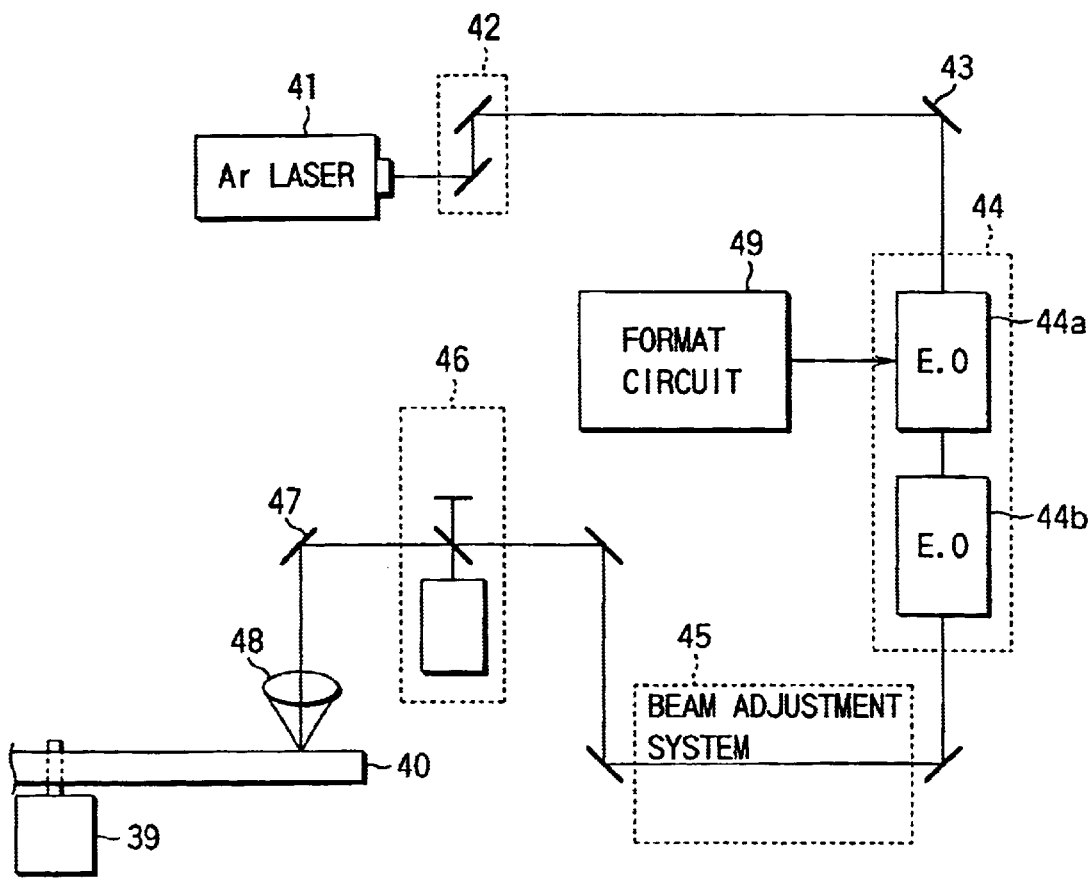
FIG. 2 is a diagram showing a master disk recording apparatus for recording a recess and a protrusion profile corresponding to a groove and a pit on a master disk by cutting in a fabricating process for a recording/reproducing optical disk pertaining to an embodiment of the present invention.

In FIG. 2, shown is a master disk recording apparatus for recording a recess and protrusion profile having grooves and pits on a master disk by cutting.

In the master disk recording apparatus, laser light (for example, Ar laser or Kr laser light) emitted from a laser light source 41 is projected into a laser optical axis control system 42 adjusting an optical axis to cope with a change in optical axis caused by a change in temperature of laser light or the like. The laser light is reflected on a mirror 43 and modulated in a beam modulation system 44 comprising E*0 modulators 44a, 44b controlled by a format circuit 49 into laser light having an arbitrary signal. At this point, the laser light can be modulated into a predetermined format signal. The format circuit 49 conducts control of the beam modulation system 44 so that the laser light is modulated in accordance with a cutting action described later. Then, the laser light is adjusted in its beam diameter and sectional shape by passing a beam adjustment system 45 composed of a pin hole and a slit. Adjustment of the laser light is finished in the process mentioned above and a beam shape can be confirmed with a beam monitoring system 46.

The laser light is further guided by a mirror 47 and converged for illumination on an optical recording master disk 40 by an objective lens 48. The optical recording master disk 40 could be, for example, a glass disk. A photoresist is coated on the glass disk and the surface of the photoresist is illuminated with the laser light. An optically activated portion produces a recess type profile by etching. A desired surface profile formed by the laser light illumination is thus obtained and a groove and a format pattern are recorded. Thus, the treated glass disk used as a master disk, may be utilized to fabricate a stamper.

In cutting, the glass disk 40 is rotated at a predetermined speed by a rotating means 39 which could be, for example, a motor or the like. An optical pickup for illuminating a predetermined position on the glass disk 40 with the laser light is moved at a constant speed along a direction from the inner side to outer side. In cutting, the optical pickup is moved at an equal speed in terms of a rate of one track pitch per one rotation of the disk and an illuminating position of the laser light is moved in company with the movement of the optical pickup. With the moving optical pickup, a portion on which laser light is directed is processed to a groove and a portion to which laser light is not directed is left unprocessed as a land. In a header section, laser light is turned on and off to produce a pit in the shape of a recess/protrusion profile.

Next, a cutting action in an exemplary embodiment of the present invention will be described in reference to FIGS. 1A and 1B.

In FIG. 1A, it is assumed that a cutting treatment for the recording section RF1 in the land sector #(m−1) whose address is indicated by the selector number #(m−1) is finished at a time t0. As described above, in a land area such as the recording section RF1 in the land sector #(m−1), laser light from the optical pickup is not projected on the area and a laser light illuminating position is only traveled. The traveling of the laser light illuminating position is achieved by a combination of rotation of an optical disk, movement of the light pickup and driving of an objective lens mounted to the light pickup.

After a treatment on the recording section RF1 in the land sector #(m−1) is finished at the time t0, the laser light illuminating position is in successively shifted toward the outer side by a half of a track pitch from the center of the track of the recording RF1 in the land sector #(m−1). At this track position, Header 1 and Header 2 whose sector number is assigned as #(m+N), that is the first half header section HF1, is recorded. At this point, the laser light radiated from the light pickup is turned on and off so that a pit is formed in a manner corresponding to information representing a sector number. Header 1 in the first half header HF1 is recorded in an adjacent manner to the recording section RF1 in the land sector #(m−1). After the recording of Header 1, Header 2 in the first half section HF1 is then recorded.

After record-cutting for Header 1 and Header 2 whose sector number is assigned as #(m+N), that is the first half header section HF1 is finished, the laser light-illuminating position is successively shifted toward the inner side by a half of a track pitch from the center of the track of Header 1 and Header 2. That is, the laser light illuminating position is shifted toward the inner side by one of a track pitch from the center of the track of the recording section RF1 in the land sector #(m−1). Header 3 and Header 4 whose sector number is #(m), that is the second half header section HF2 are recorded at the track position of this shift. At this point, the laser light is turned on and off so that a pit corresponding information expressing the sector number is formed. Header 3 in the second half header section HF2 is recorded in an adjacent manner to Header 2 in the first half header section HF1. After the recording of Header 3, Header 4 is recorded.

After cutting for Header 3 and Header 4, whose sector number is #(m), that is the second half section HF2 is finished, cutting for recording are subsequently conducted for the recording section RF6 in the groove sector #(m) following the mirror section. At this point, laser light is not irradiated on the mirror section. The laser light illuminating position is shifted toward the outer side by a half of a track pitch from the center of the track of Header 3 and Header 4 with the sector number #(m), That is, the laser light illuminating position is shifted to not only the same track position as the track center of the recording section RF1 in the land sector #(m−1) but also a track position located toward the inner side by a half of a track pitch from the track center of Header 1 and Header 2 with the sector number #(m+N).

Cutting for recording is conducted for the recording section RF6 in the groove sector #(m) at thus shifted track position. In the recording section RF6 in the groove sector #(m), laser light is irradiated and a groove is formed by etching of a photoresist. At this point, a laser light spot is subjected to for example, a sine wave oscillation in a 186 channel bit period along a direction from the inner side to the outer side, that is along a radial direction to fabricate a groove in the form of a wave. A signal component obtained from the groove in the form of the wave is utilized as a reference signal for generation of clock in a data write operation (that is, when information is recorded on a recording/reproducing optical disk).

In the one round of a track from the sector number #(m) to the sector number #(m+N−1), all the sectors are groove sectors. In the groove sectors, the cutting for recording is conducted by predetermined procedures described below. The cutting except a first sector will be described in reference to FIG. 1B.

In FIG. 1B, it is assumed that a cutting treatment for the recording section R5 in the groove sector #(n−1), whose address is indicated by the selector number #(n−1), is finished at a time t1. After a treatment on the recording section R5 in the groove sector #(n−1) is finished, the laser light illuminating position is in successively shifted toward the outer side by a half of a track pitch from the track center of the recording section R5 in the groove sector #(n−1). Header 1 and Header 2 whose selector number is #(n+N), that is the first half header section H1 is recorded at the track position of such a shift. At this point, the laser light radiating from the optical pickup is turned on and off so that a pit is formed in a manner corresponding to information representing a selector number. Header 1 in the first half header section H1 is recorded adjacent to the recording sector R5 in the land sector #(n−1). After the recording Header 1 is finished, Header 2 in the first half header section H1 is then recorded.

When cutting for recording for Header 1 and Header 2 with the sector number #(n+N), that is the first half header section H1 is finished, subsequently, the laser light-illuminating position is shifted toward the inner side by a half of a track pitch from the track center of Header 1 and Header 2. That is, the laser light illuminating position is shifted toward the inner side by a half of a track pitch from the track center in the recording section R5 in the groove sector #(n−1). Header 3 and Header 4 with the sector number #(n), that is the second half header section H2 is recorded at the position of this shift. At this point, the laser light radiating from the optical pickup is turned on and off so that a pit corresponding to information expressing a sector number is formed. Header 3, in the second half section H2, is recorded adjacent to Header 2 in the first half header section H1. After recording for Header 3 is finished, Header 4 in the second half header section H2 is recorded.

After Header 3 and Header 4 with the sector number #(n), that is the second half header section H2 is finished, cutting for recording for the recording section R6 in the groove sector #(n) is subsequently conducted after the passage of a mirror section. At this point, laser light is not illuminated on the mirror section. The laser light illuminating position is shifted toward the outer side by a half of a track pitch from the track center of Header 3 and Header 4 with the sector number #(n). That is, the laser light illuminating position is shifted to not only the same track position as the track center of the recording section R5 in the groove sector #(n−1) but also a track position located toward the inner side by a half of a track pitch from the track center of Header 1 and Header 2 with the sector number #(n+N).

Cutting for recording is conducted for the recording section R6 in the groove sector #(n) at the track position of such a shift. In the recording section R6 in the groove sector #(n), laser light is irradiated and a groove is formed by etching of a photoresist. At this point, a laser light spot is subjected to for example, a sine wave oscillation in a 186 channel bit period along a direction from the inner side to the outer side, that is along a radial direction to fabricate a groove in the form of a wave. A signal component obtained from the groove in the form of the wave is utilized as a reference signal for, generation of clock in a data write operation.

With the cutting actions from the group sector #(n−1) to the group sector #(n) being repeated in a similar manner, achieved is the cutting for recording from the recording section RF6 with the sector number #(m) to the recording section RF5 with the sector number #(m+N−1), as shown in FIG. 1A.

After the cutting for recording on the recording section RF6 in the groove sector #(m) to the recording section RF5 in the groove sector #(m+N−1) is finished, another cutting treatment on the first sector shown in FIG. 1A is conducted. The first sector at this time is the land sector #(m+N), which follows the groove sector #(m+N−1). One round of a track of the sector number #(m+N) of the land sector #(m+N) to the sector number #(m+2N−1) are all land sectors. Therefore, in the one round of a track from the sector number #(m+N) to the sector number #(m+2N−1), laser light is not turned on. Header sections of the land sections are already simultaneously formed in the cutting of groove sectors on the inner side.

After the cutting treatment on the land sector with the sector number #(m+N) to the land sector with the sector number #(m+2N−1) has been completed, the first sector is again subjected to a cutting treatment. The first sector at this time is the groove sector #(m+2N) following the land sector #(m+2N−1). Sectors following the groove sector #(m+2N) are cut in a similar manner to the cutting conducted subsequent to the cutting of groove sector #(m). With repetition of the cutting action, sectors having header sections of a structure shown in FIG. 1A can be fabricated.

If the cutting for recording described above is conducted, a header section in a groove sector, that is the second half header section comprising Header 3 and Header 4 and a recording section in a groove sector with the same sector number as the sector number of the header section are cut for recording in a continuous manner. For example, the second half header section HF2 comprising Header 3 and Header 4 with the sector number #(m) and the recording section RF6 in the groove sector #(m) are continuously cut.

However, a header section in a land sector, that is the first half header section comprising Header 1 and Header 2 and a recording section in a land sector with the same sector number as the sector number for the header section are not cut for recording in a continuous manner but recorded on different tracks by one round of a track. For example, the first half header section HF1 comprising Header 1 and Header 2 with the sector number #(m+N) and the recording section RF2 in the land sector #(m+N) are recorded in different tracks by one round of a track. Therefore, if there is a difference between one period of rotation of a disk and one period of a recording signal for N sector, cutting for recording is conducted with a discrepancy arising between a header section in a land sector and a recording section in a land sector whose sector number is shown with the header section.

Described will be a sector format according to an embodiment of the invention of the present application which enables a header section to be detected with high reliability even when recording/reproduction of information is conducted on an optical disk fabricated by the cutting for recording with such a discrepancy in the header section.

FIG. 3A shows the entire structure of a sector according to an embodiment of the invention of the present invention. FIG. 3B shows a header section of the sector in a more detailed manner.

In FIG. 3A, the total byte number of a sector is 2697 bytes, which comprises: Header field of −128 bytes (hereinafter referred to as header section); Mirror field of 2 bytes (hereinafter referred to as mirror section); Recording field of 2567 bytes (hereinafter referred to as recording section). The header section, mirror section and recording section correspond to the headers described in FIGS. 1A and 1B.

The header and mirror-sections are portions in which recording has been conducted as a recess/protrusion profile before shipment of an optical disk. Recording according to a predetermined format, such as recess/protrusion profiling in advance of shipment, is called preformatting.

A recording section is a portion where information discernible based on an address information shown by a corresponding header section is recorded according to a predetermined format by a user of an optical disk after shipment of the optical disk. The recording section is a portion as a recording area of information fabricated only in the form of a groove or land when the preformat is conducted.

Recording of information on a recording section, for example, in the case where an optical disk is of a phase change type is carried out by: irradiating laser light which is modulated in a corresponding manner to recording information on a recording film of a phase change type provided in the recording section; and forming areas in a crystalline state or in an amorphous state on the recording film of a phase change type by modulation of the laser light. The user of the optical disk reproduces the information by utilizing a difference in reflectance based on a change in optical property between crystalline and amorphous states of the recording film in the recording section.

The recording section is recorded by a format comprising: a gap section (Gap field) of (10+J/10) bytes; a guard section (Guard 1 field) of (20+K) bytes; a VFO 3 section (VFO 3 field) of 35 bytes; a PS section (PS field) of 3 bytes; a data section (Data field) of 2418 bytes; a PA 3 section (PA 3 field) of 1 byte; a guard 2 section (Guard 2 field) of (55−K) bytes; and a buffer section (Buffer field) of (25−J/16) bytes, wherein J is an integer in the range of 0 to 15, K is an integer in the range of 0 to 7 and both assume random values.

FIG. 3B shows a content of a header section in a sector format of an optical disk according to an embodiment of the invention of the present application. The header section comprises: Header 1 field; Header 2 field; Header 3 field; and Header 4 field. These indicate the same as Header 1; Header 2; Header 3; and Header 4 described in reference to FIGS. 1A and 1B. These are hereinafter respectively referred to as Header 1; Header 2; Header 3; and Header 4. Lengths for Headers are: 46 bytes for Header 1; 18 bytes for Header 2; 46 bytes for Header 3; and 18 bytes for Header 4, and the total length of the header section is 128 bytes.

Each of Header 1, Header 2, Header 3 and Header 4 comprises: a VFO section; a AM section; a PID section; an IED section; and a PA section. The structure will be described below.

A VFO is an abbreviation of Voltage Frequency oscillator and is an area for enabling PLL (Phase Locked Loop) to function in a proper manner. That is, the VFO section comprises continuously repeated data patterns which are read by an optical disk recording/reproducing apparatus. The recording/reproducing apparatus performs information recording/reproducing on an optical disk, from which a synchronization signal (clock signal), is used for data read. Rotational speed control of the disk and the like, is provided to a PLL circuit incorporated in the optical disk recording/reproducing apparatus. The data patterns are continuously repeated to lock the PLL in order to establish perfect synchronization. If the PLL is locked, data reading, disk rotational speed control and the like can be accurately realized since a code pattern of the VFO is changed in synchronism with a change in rotation of the optical disk.

The VFO section has a length of 36 bytes as a VFO1 in Header 1 and Header 3 and on the other hand, a length of 8 bytes as VFO2 in Header 2 and Header 4. That is, as described above, a first half comprises Header 1 and Header 2, which is used as a header section for a land sector. A VFO section of Header 1, which is a head portion in the first half header section, is set to be longer than a VFO section of Header 2 on which laser light is applied after irradiation on Header 1. In a similar manner, a second half header section comprises Header 3 and Header 4, which is used as a header section of a groove sector and a VFO section of Header 3, which is a head potion in the second half header section, is set to be longer than a VFO section of Header 4 on which laser light is irradiated after irradiation on Header 3. A VFO section of each sector has at least a length of 8 bytes and a PLL can usually function in a proper manner with use a VFO section of a similar length.

Since the VFO section of Header 1 and the VFO section of Header 3, which correspond with head portions of the sectors, are set to be longer than the VFO section of Header 2 and the VFO section of Header 4, the PLL can accurately function. Therefore, detection of each of the header sections can be conducted with high reliability and information recording/reproducing can be achieved with higher precision.

The technique described above is especially effective in information recording/reproducing on an optical disk which is fabricated with a discrepancy in the header section of a land sector.

That is, in the case of a land sector, there is a time difference of one round of a track between cutting for a header section and cutting for a recording section in the land sector whose sector number is shown by the header section. In such a condition, if there arises a difference between one period of rotation of a disk and a period of recording signal covering N sectors, cutting for recording is conducted with a discrepancy between the header section and the corresponding recording section. If such a discrepancy arises, detection of the header section becomes more difficult. It is conceivable that if there is provided an offset in tracking in addition to the discrepancy of the header section, a difference in quality of a reproductive signal between the header section and the corresponding recording section of the land sector also produces difficulty in detection of the header section.

Even in such a case, since a VFO section of Header 1, which is a head portion of a land sector, is designed to be longer, to function of the PLL can be executed with higher reliability. A reliable PLL function increases the precision of header detection.

AM, an abbreviation of Address Mark, is a synchronous code having a length of 3 bytes and used for judging a word boundary in demodulation. PID is an abbreviation of Physical ID and comprises a sector information having a length of 1 byte and a sector number having a length of 3 bytes. IED is an abbreviation of ID Error Detection code and a code for error detection of 4 bytes having a length of 2 bytes. PA is an abbreviation of Post Amble and a code having a length of 1 byte which is necessary to establish a state of previous bytes in demodulation.

Description will be provided in the case where an emboss section of a recording/reproducing optical disk having headers as described above, is read in an information recording/reproduction process.

Figure 4:
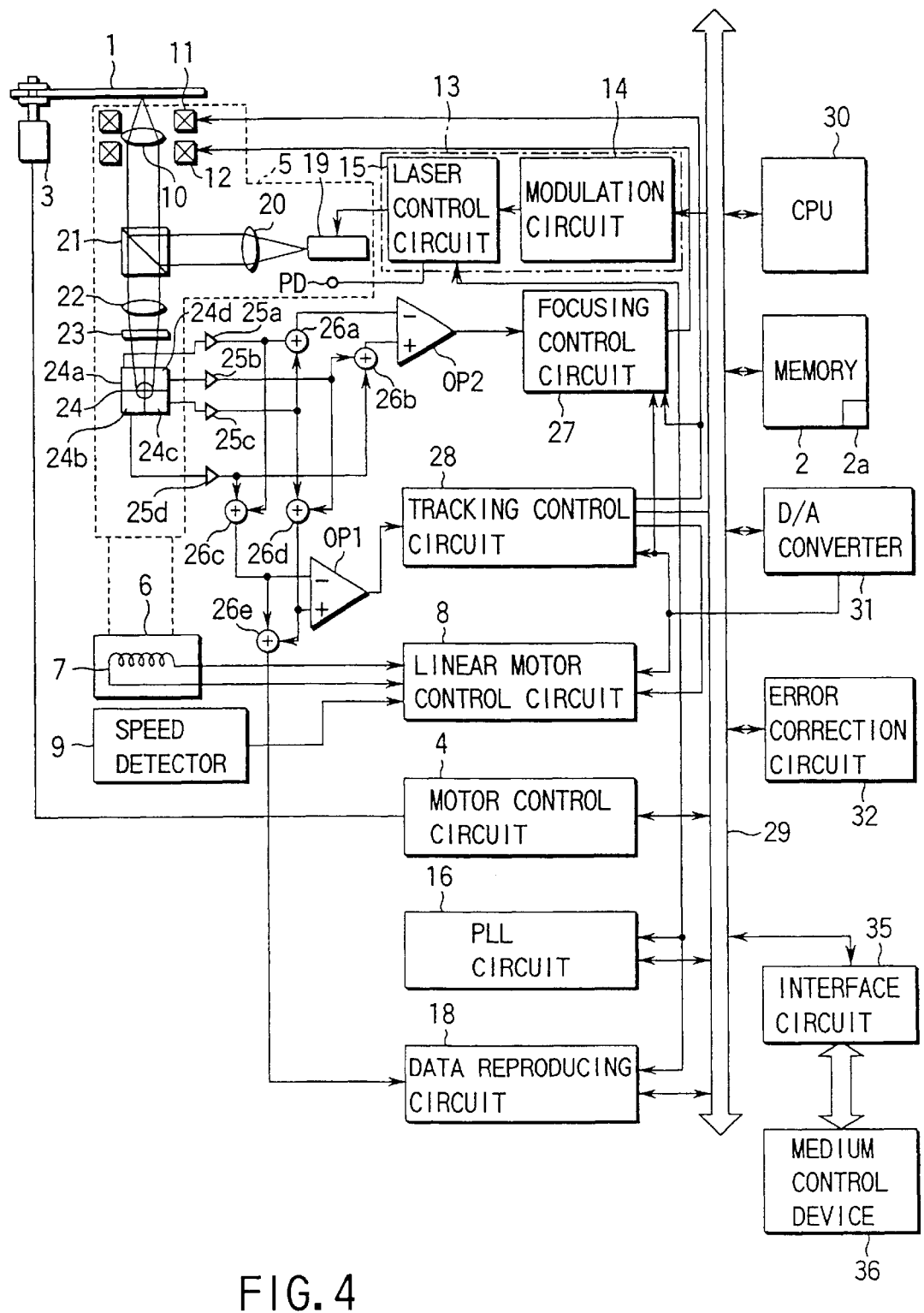
FIG. 4 is a block diagram showing an optical disk apparatus used for information recording/reproducing on a recording/reproducing optical disk pertaining to an embodiment of the present invention.

FIG. 4 is a block diagram showing the overall constitution of an optical disk apparatus used for information recording/reproducing on a recording/reproducing optical disk.

In FIG. 4, a recording/reproducing optical disk 1 which is an information recording medium in the shape of a circular plate is rotated by a spindle motor 3, for example, at a constant linear speed. The spindle motor 3 is controlled by a motor control circuit 4. Information recording/reproducing on the optical disk 1 is conducted by an optical pickup 5. The optical pickup 5 is fixed to a driving coil 7 constituting a moving section of a linear motor 6 and the driving coil 7 is connected to a linear motor control circuit 8.

A speed detector circuit 9 is connected to the linear motor control circuit 8 and a speed signal of the optical pickup 5 detected by the speed detector circuit 9 is transmitted to the linear motor control circuit 8. A stationary section of the linear motor 6 is provided with a permanent magnet not shown and the driving coil 7 is activated by the linear motor control circuit 8, whereby the optical pickup 5 is moved along a radial direction of the optical disk 1.

The optical pickup 5 is provided with an objective lens 10 supported by a wire or a leaf spring not shown. The objective lens 10 can be moved not only along a focusing direction (an optical axis direction of the lens) by driving of a driving coil 11, but also in a tracking direction (a direction orthogonally intersecting an optical axis of the lens) by driving of a driving coil 12.

A laser light beam is emitted from a semiconductor laser oscillator 9 under driving control of a laser control circuit 13. The laser control circuit 13 comprises a modulation circuit 14 and a laser driving circuit 15 and is operated in synchronization, with a recording clock signal supplied from a PLL circuit 16. The modulation circuit 14 modulates recording data supplied from an error correction circuit 32 into a signal suitable for recording, for example an 8–16 modulated data. The laser driving circuit 15 drives the semiconductor laser oscillator (or an argon/neon laser oscillator) 19 according to the 8–16 modulated data from the modulation circuit 14.

The PLL circuit 16 divides a master frequency generated by a crystal oscillator into a frequency corresponding to recording positions on the optical disk 1 in a recording process. This process thereby generates not only a recording clock signal but a reproducing clock signal corresponding to a reproduced synchronous code in a reproducing process, and further detects any abnormality in a frequency of the reproducing clock signal. The detection of the frequency abnormality is performed by judging whether or not the frequency of the reproducing clock signal falls within the range of a predetermined frequency corresponding to a recording position on the optical disk 1 from which a data is reproduced. The PLL circuit 16 outputs a recording or reproducing clock signal in a selective manner according to a control signal from CPU 30 and a signal from a binarization circuit 41 in the data reproducing circuit 18.

A laser beam emitted from the semiconductor oscillator 19 is guided through a collimator lens 20, a half prism 21 and an objective lens 10 and finally directed on the optical disk 1. Reflecting light from the optical disk 1 is guided through an objective lens 10, a half prism 21, a collective lens 22 and a cylindrical lens 23 then to a photodetector 24.

The photodetector 24 constructed from light detecting cells 24a, 24b, 24c and 24d, wherein the photodetector 24 is divided in four ways. Among them, output signals from the light detecting cells 24a, 24b, 24c, 24d are respectively supplied through amplifiers 25a, 25b, 25c, 25d to a terminal of an adder 26a, a terminal of an adder 26b, the other terminal of the adder 26a and the other terminal of the adder 26b.

Output signals from the light detecting cells 24a, 24b, 24c, 24d are respectively supplied through amplifiers 25a, 25b, 25c, 25d to a terminal of an adder 26c, a terminal of an adder 26d, the other terminal of the adder 26d and the other terminal of the adder 26c.

An output signal of the adder 26a is supplied to the inversion input terminal of a differential amplifier OP2 and an output signal of the adder 26b is supplied to the non-inversion input terminal of the differential amplifier OP2. The differential amplifier OP2 outputs a signal relating to a focal point in accordance to a difference between output signals of the adders 26a, 26b. The output is supplied to a focusing control circuit 27. An output signal of the focusing control circuit 27 is supplied to a focusing driving coil 12. Thereby, the laser light is controlled on the optical disk 1 to be in a state of continuously focusing.

An output signal of the adder 26c is supplied to the inversion input terminal of a differential amplifier OP1 and an output signal of the adder 26d is supplied to the non-inversion terminal of the differential amplifier OP1. The differential amplifier OP1 outputs a track difference signal according to a difference between the signals of the adders 26c, 26d. The output is supplied to a tracking control circuit 28. The tracking control circuit 28 generates a track driving signal according to the track difference signal from the differential amplifier OP1.

The track driving signal, output from the tracking control circuit 28, is supplied to a driving coil 11 in a tracking direction. Moreover, the track difference signal used in the tracking control circuit 28 is supplied to the linear motor control circuit 8.

With application of the above described focusing control and tracking control, a change in a reflectance on a pit or the like formed in a manner corresponding to recording information on a track of the optical disk 1 is reflected in a sum signal of output signals of the light detecting cells 24a to 24d of the photodetector 24, that is, an output signal of the adder 26e which is the sum of outputs of the adders 26c, 26d. The sum signal is. supplied to the data reproducing circuit 18. The data reproducing circuit 18 reproduces a recording data based on a reproducing clock signal from the PLL circuit 16.

The data reproducing circuit 18 not only detects a sector mark in preformatted data based on an output signal of the adder 26e and a reproducing clock signal from the PLL circuit 16, but also reproduces a track number and a sector number as address information from a binarized signal supplied from the PLL circuit 16, based on the binarized signal and the reproducing clock signal from the PLL circuit 16.

A reproducing data of the data reproducing circuit 18 is supplied to a error correction circuit 32. The error correction circuit 32 corrects an error by use of an error correcting code (ECC) in the reproducing data and outputs recording data supplied from an interface circuit 35 with an error correcting code (ECC) added thereto to a memory 2.

A reproducing data error-corrected in the error correction circuit 32 is supplied to a medium control device 36 as an external device through a bus 29 and the interface circuit 35. A recording data generated from the medium control device 36 is supplied to the error correction circuit 32 through the interface circuit 35 and the bus 29.

When the objective lens 10 is moved by the tracking control circuit 28, the linear motor 6, that is the optical pickup 5, is moved by the linear motor control circuit 8 so that the objective lens 10 is located at a position in the vicinity of the center in the optical pickup 5.

A D/A converter 31 is used for information receiving/supplying between the focusing control circuit 27, the tracking control circuit 28, the linear motor control circuit 8 and the CPU 30 controlling the whole system of the optical disk apparatus.

The CPU 30 controls the motor control circuit 4, the linear motor control circuit 8, the laser control circuit 15, the PLL circuit 16, the data reproducing circuit 18, the focusing control circuit 27, the tracking control circuit 28, the error correction circuit 32 and the like through the bus 29. The CPU 30 conducts a predetermined operation according to a program stored in a memory 2.

Description will be provided for reading a header section preformatted on a recording/reproducing optical disk, according to an exemplary embodiment of the present invention, when information recording/reproducing is conducted on the optical disk by the optical disk apparatus having the structure described above in reference to FIG. 1A.

In FIG. 1A, in the case where a header section to be read is, for example, the header section HF2 in the groove sector indicated by the sector number #(m), laser illumination on the recording section RF1 in the land sector indicated by the sector number #(m−1) is conducted ahead of reading the header section HF2. The laser light spot directed to the recording section RF1 is moved while following the track center of the recording section RF1. The following of the laser light spot is performed by tracking control in the optical disk apparatus which is already described in reference to FIG. 4.

The laser light directed to the recording section RF1 in the land sector indicated by the sector number #(m−1) while following the track center subsequently directed to the header sections HF1 and HF2 recorded on the optical disk 1.

As described above, the header sections HF1 and HF2 comprise data of a length of 128 bytes in total. Here, if one byte has a physical length of about 3 µm, the header sections HF1 and HF2 have the total length of about 400 µm physically. If laser light illumination is conducted on the optical disk at a linear speed of about 6 m/s, the laser light spot passes from the header section HF1 to the header section HF2 in about 67 µs.

The light spot can follow the header sections even when the header sections change in repeating alternate sharp turns in a zig-zag shifted manner, as shown in FIG. 1A. Therefore, it may be considered that the light spot follows an imaginary track center. While the imaginary track center is different from the actual track center of the header sections HF1 and HF2, data such as address information and the like preformatted in the headers HF1 and HF2, can sufficiently be read. After the reading of the headers HF1 and HF2 is finished and the mirror section is passed by, laser light radiated from the optical pickup is applied to the recording section RF6 indicated by the selector number #(m), while following the imaginary track center.

In this case, the recording section in a sector, which is illuminated with laser light after illumination on the headers HF1 and HF2, is the recording section FR6 in the groove sector. The header section used in a groove sector, as described above, is the second half header section comprising Header 3 and Header 4, and the header HF2 is a second half section in the header sections HF1 and HF2 which are read in advance. Therefore, the second header section HF2 is used a s a header section of the recording section RF6 and address information of the recording section RF6 is indicated by the second half header section HF2.

Figure 5:
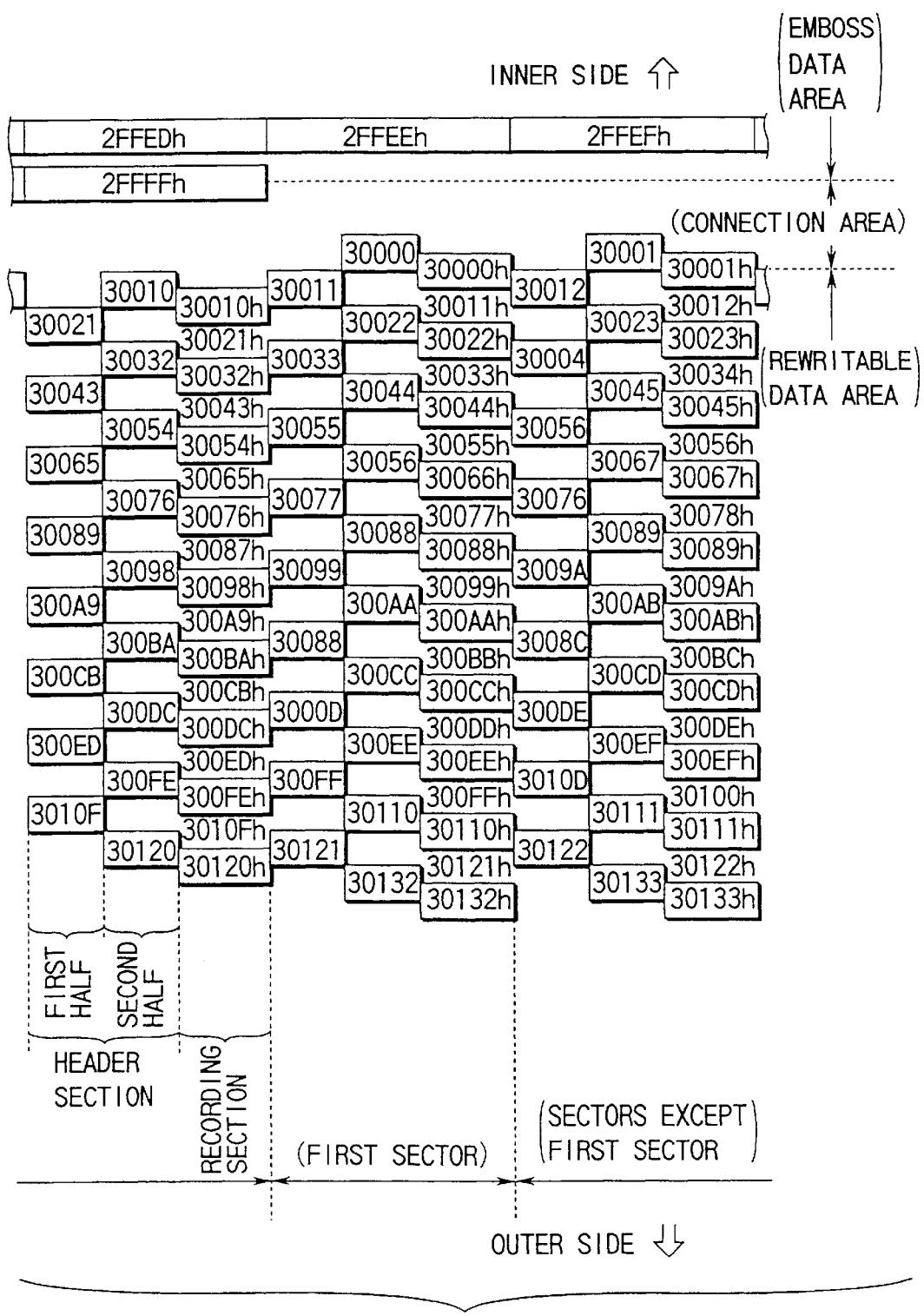
FIG. 5 is a presentation as a model showing header sections disposed in a zig-zag shifted manner and a structure in the neighborhood of the header sections pertaining to an embodiment of the present invention.

As described above, header sections disposed in a zig-zag shifted manner are formed on an optical disk pertaining to the invention of the present application. Header sections disposed in a zig-zag shifted manner and a structure in the neighborhood of the header sections are shown in FIG. 5 as a model. In the figure, the representation is drawn so that the upper side is the inner side of an optical disk and the lower side is the outer side thereof as shown by white arrows each with an English term. Therefore, the direction from the upper side to the lower side or vice versa corresponds to a radial direction of an optical disk.

In FIG. 5, the case where section addresses are in the range of 30000h to 30133h is exemplified. A letter h, to follow the last figure, is an abbreviation of the word hexadecimal and represents that the numbers are of the hexadecimal notation. In FIG. 5, portions of the hexadecimal notation are recording sections and portions without the letter h at the end, are shown as header sections.

In addition, in recording sections of sectors, the sectors in which sector addresses are respectively indicated by 30000h, 30001h, 30010h, 30022h, 30023h . . . are shown as groove sectors. The sectors in which sectors addresses are indicated by 30011h, 30012h, 30021h, 30034h, . . . are shown as groove sectors.

In this case, a header section indicated by a number and a recording section with the same number as that indicating the header section plus the letter h following the number in a combined manner constitute one sector as a pair. In the figure, if a header section indicated by the number 30000 is described as (30000h) header section and the recording section in a groove sector recording section, for example, the (30000h) header section and the (30000h) groove recording section, sector information of the sector address 30000h is recorded in a preformat and a user records information indicated by the sector address 30000h in the (30000h) groove sector recording section.

In FIG. 5, the same structure of a header section as that according the invention of the present application described in reference to FIG. 1A is shown as a model. In an optical disk comprising header sections formed as shown in FIG. 5, a tracking polarity is alternately switched in a radial direction in a manner such as in the order of land/groove/land/groove, each corresponding to one track round without any track jump when a track is traced in a spiral manner as described in FIG. 1A.

In the case of FIG. 5, the number of sectors in one track round is shown as 17 (11h in the hexadecimal notation) and when a track is traced in one more round, the number of sector addresses on a track adjacent toward the outer side is an increment of 17. For example, sectors adjacent, toward the outer side, to other sectors whose number of sector addresses is 30000h have 30011h as the number of sector addresses.

In FIG. 5, the sectors indicated by 30000h, 30011h, 30022h, 30033h . . . as sector addresses are those at positions where a tracking polarity is switched over, as described above. The sectors indicated by 30010h, 30021h, 30032h, 30043h . . . as sector addresses and in addition, the sectors indicated by 30001h, 30012h, 30023h, 30034h . . . as sector addresses are sectors other than the first sectors.

In a system in which groove sectors and land sectors alternately switched in a radial direction one track round as a unit as described above, there arises a necessity that a polarity of groove or land is switched over in tracking and sectors located at positions of polarity switch-over have a different header configuration than the other sectors.

For example, the first header section for the (30000h) groove sector recording section is recorded with the address number of 30011h in preformat and the second header section therefor is recorded with the address number of 30000h in preformat. Since the (30000h) groove sector recording section is of a groove type, the address number of 30000h recorded in the second half header section is the sector address.

On the other hand, the first half header section, for example, the (30011h) land sector recording sections is recorded in advance with the address number of 300011h in preformat. The second half header section, therefore, is recorded in advance with the address number of 30022h in preformat. Since the (30011h) land sector recording section is of a land type, the address number 300011h recorded in the second header is the sector address.

Positional relations of such a zig-zag shift header configuration will be described in the case of a groove sector as start. There is a positional relation that a first half header section is wobbled to the outer side but a second half header section is wobbled to the inner side. That is, settings are such that the first half header section is shifted toward the outer side of an optical disk, relative to a track position of the groove sector, by a half of a track pitch and the second half header section is shifted toward the inner side of the optical disk by a half of the track pitch. On the hand, in the case of a land sector, the positional relation of headers is reversed to that of the case of a groove sector and a first half header section is wobbled toward the inner side and a second half header section is wobbled toward the outer side.

In a system in which groove sectors and land sectors are alternately switched over in a radial direction one track round as a unit, a polarity of groove or land is switched over to the other in tracking. Timing of the switch-over is conducted in dependence to reading on a header section. That is, the header section is read and a correct polarity is selected by discerning whether the recording section is of a land type or of a groove type based on information obtained from the reading before tracking in the recording section following the header section gets started.

At this point, if the following recording section is discerned to be of a land type based on information obtained from the header section, a tracking polarity is selected to be of a land type and tracking in the recording section is then conducted. If, to the contrary, the following recording section is discerned to be of a groove type based on information from the header section, the tracking polarity is selected to be of a groove type and tracking in the recording section is then conducted.

Switching of the tracking polarity is conducted when laser light illuminating position is located in the mirror section (Mirror Field) shown in FIG. 1A. When the position in the mirror section is specified, information obtained from the header section is also utilized. That is, if information can be read from any of Header 1, Header.2, Header 3 and Header 4 which constitute a header section with precision, a position in the mirror can be specified by calculating retroactively from the reading position.

For example, In the case where reading is conducted on Header 1 in an ordinary manner, counting of the number of bits begins when the reading on Header 1 is finished. Since a sector format in the header section is determined in advance as shown in FIG. 3, the number of bits needed to reach the mirror section starting, at a position where the reading on Header 1 is finished, is determined in advance. Therefore, when the predetermined number of bits is counted from the time when the reading on Header 1 is finished, it is assumed that the mirror section is illuminated with the laser and switch-over of the tracking polarity is conducted. After the polarity is switched over to a correct polarity in the mirror section, tracking in a land or groove recording section gets started.

In the land/groove polarity switch-over thus conducted, the above mentioned relation between the inner side wobbling and outer side wobbling can be utilized for detection of timing in the switch-over. Described below will be a process for detection of timing in the land/groove switch-over by use of this relation between wobblings to the inner and outer sides.

Timing detection for the land/groove polarity switch-over is conducted by use of the photodetector 24 shown in FIG. 24. The photodetector 24 is constructed from light detecting cells 24a, 24b, 24c and 24d, which represents a four way division. As described, output signals of the light detecting cell 24a and the light detecting cell 24b are summed in the adder 26c, and output signals of the light detecting cell 24c and the light detecting cell 24d are summed in the adder 26d.

Output signals of the adder 26c are supplied to the inversion input terminal of the differential amplifier OP 1 and output signals of the adder 26d are supplied to the non-inversion terminal of the differential amplifier OP 1. The differential amplifier OP 1 outputs a track difference signal in accordance with a difference between the output signals of the adders 26c and 26d. The output is supplied to the tracking control circuit 28, whereby the track driving signal is generated by the tracking control circuit 28 in accordance with the track difference signal from the differential amplifier OP 1.

The track driving signal output from the tracking control circuit 28 is supplied to the driving coil 11 in the direction of tracking or the track difference signal used in the tracking control circuit 28 is supplied to the linear motor control circuit 8, and thereby tracking control is conducted.

The photodetector 24 may be divided into two groups. That is, a first pair consisting of the light detecting cells 24a, 24b and a second pair consisting of the light detecting cells 24c, 24d, wherein the two pairs are divided in relation to a direction along a recording track.

For clarification, the following situation and designation are provided. The first light detecting cell pair of the two pairs formed by division in two ways is located in a corresponding manner to the outer side of a recording track and an output signal from the first light detecting cell pair is indicated by A. The second light detecting cell pair of the two pairs formed by division in two ways is located in a corresponding manner to the inner side of the recording track and an output signal from the second light detecting cell pair is indicated by B.

When illumination by a light beam is conducted while following a track, if the light beam travels on a header section wobbled toward the outer side, an output of the signal A is increased but an output of the signal B is decreased. On the other hand, if the light beam travels on a header section wobbled toward the inner side, an out put of the signal B is increased but an output of the signal A is decreased.

At this point, if a (A–B) signal, which is a difference between both signals is generated, (A–B)>0 in the header section wobbled toward the outer side and (A–B)<0 in the header section wobbled toward the inner side, and (A–B)=0 in the other situation. For simplicity, it is hereinafter adopted that the condition of (A–B)>0 is indicated by [+], the condition of (A–B)<0 is indicated by [–] and the condition of (A–B)=0 is indicated by [0].

Figure 8A:
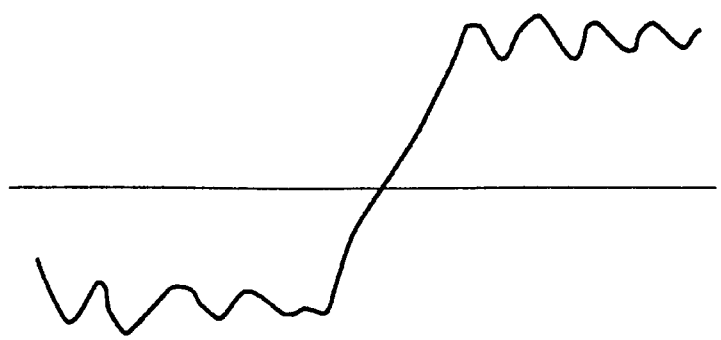
FIGS. 8A and 8B are graphs showing signal changes in reading zig-zag shift headers of the present invention.

If the (A–B) signal output which is output from such a photodetector 24 is utilized, the (A–B) signal is changed from [+] to [–] prior to illumination of the light beam on the recording section of a groove sector when the light beam travels through the groove sector. This change is shown in a graph of FIG. 8A.

Figure 8B:
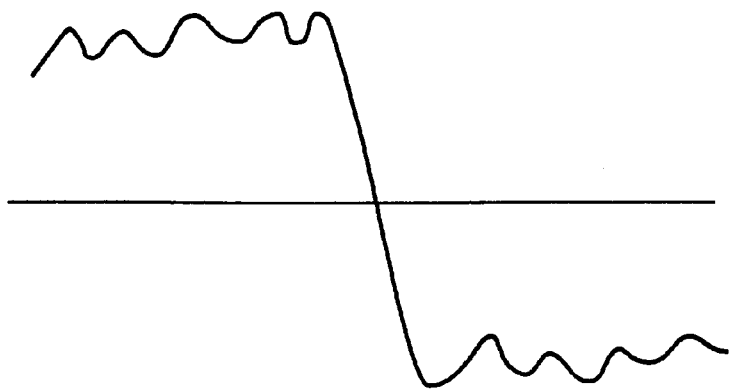

On the other hand, the (A–B) signal output is changed from [–] to [+] prior to illumination of the light beam on the recording section of a land sector when the light beam travels through the land sector. This change is shown in a graph of FIG. 8B. Therefore, it is possible that a polarity change of the (A–B) signal output is monitored by the tacking control circuit with the help of the differential amplifier OP 1 interposing there between and detection of land or groove is performed by processing of the CPU 30, whereby timing in land/groove switch-over can be detected.

That is, when the (A–B) signal output is changed from [+] to [–], it is detected that a recording section, which the light beam illuminates after the change, is the recording section of a groove sector. If the groove sector at this point is a groove sector in the first sector, control is performed so that a tracking polarity is switched over from land to groove in order to have tracking control conducted in an orderly manner.

In a similar manner, when the (A–B) signal output is changed from [–] to [+], it is detected that a recording section which the light beam illuminates after the change is the recording section of a land sector if the groove sector at this point is a land sector in a first sector, control is performed so that a tracking polarity is switched over from groove to land in order to have tracking control conducted in an orderly manner.

As seen from the description above, if a polarity change in the (A–B) signal output is utilized, timing detection in land/groove polarity switch-over can be effected.

Description will be given for a method in which timing detection in the land/groove polarity switch-over is conducted by use of recording information recorded in preformat in the header on an optical disk, that is, sector type bits in the header.

Prior to the description, a header structure shown in FIG. 5 will be described. As previously stated, with adoption of the numbering method for a sector address which, with reference to FIG. 1A, disk cutting for recording of a single spiral structure can be continuously performed from the inner side to the outer side in one operation on an optical disk with zig-zag shift headers as shown in FIG. 5. Recording signals in the cutting are sequentially sent from a format circuit 49 in the master disk recording apparatus shown in FIG. 2 in the following order and the beam modulation system 44 comprising the E*0 modulators 44a, 44b is thus controlled, whereby the cutting is conducted while following the sector address numbering method.

The sending order of the recording signals is an order that [(30011h) header section–(30000h) header section→(30000h) groove sector recording section→(30021h) header section→(30010h) header section→(30010h) groove sector recording section→one round is blank→(30033h) header section (30022h) header section→(30022h) groove sector recording section→. . . the rest is omitted.

The concrete content of the (30011h) header section will be described in reference to FIG. 3B. The header section is an emboss header in which not only 030011h is recorded in the low order 3 bytes of PID 1 section (4 bytes) of Header 1 but 030011h is also recorded in the low order 3 bytes of PID 2 section (4 bytes) of Header 2. The concrete content of the (30000h) header section is an emboss header in which not only 030000h is recorded in the low order 3 bytes of PID 3 section (4 bytes) of Header 3 but 030000h is also recorded in the low order 3 bytes of PID 4 section (4 bytes) of Header 4.

A land/groove recording disk of a single spiral type can be fabricated by following the sector address numbering method. The disk has a series of sector addresses in a continuous manner wherein a first address is directly followed by a second address which is larger or smaller than the first address by 1. Using this technique, the entire surface can be processed without a track jump or any seek.

However, as described above, in a land/groove recording disk of a single spiral type, there is a necessity for tracking polarity switch-over between any pair of adjacent track rounds. That is, in the (30010h) groove sector recording section of FIG. 5, a tracking polarity is of a groove type, but portions which are subsequently illuminated with a light beam are of a groove polarity for the (30011h) header section and of a land polarity for the (30011h) groove sector recording section in tracking.

Switch-over in tracking polarity is conducted by a method in which sector bits in a header section is utilized, which is described below, in addition to the above described method in which the switch-over is conducted by use of a polarity of a (A–B) signal.

The contents of the PID sections of headers are shown in FIG. 3B and PID 1 section is provided in Header 1, PID 2 section is provided in Header 2, PID 3 section is provided in Header 3 and PID 4 section is provided in Header 4. Each PID section comprises information of 32 bits (4 bytes). The bits are respectively indicated by b 31 to b 0, wherein b 31 is the highest order bit (MSB) and b 0 is the lowest order bit (LSB).

Eight bits (1 byte) from b 31 to b 24 of the whole from b 31 to b 0, which constitute a PID section, is a portion where information about the sector is recorded. 24 bits (3 bytes) from b 23 to b 0 present a sector number where information about a sector address is recorded.

The content of sector information will be described below. The b 31 and b 30 are reserved bits and for example, they are temporarily recorded with 00 b and a portion where it is reserved for recording some kind of information in the future. A letter b which follows FIGS. 00 of the 00 b is an abbreviation of the word binary, which shows the number is of a binary notation. The bits b 29 and b 28 shows a physical ID number, and 00 b is recorded in the PID section, 01 b is recorded in the PID2, 10 b is recorded in the PID 3 and 11 b is recorded in the PID 4.

The bits b 27 to b 25 are a portion where a sector type is shown and a sector for read only is recorded with 000 b, a writable first sector is recorded with 100 b, the writable last sector is recorded with 101 b, a writable sector ahead of the last sector by one sector is recorded with 110 b and a sector other than the above described is recorded with 111 b, wherein sectors from 001 b to 011 b are held for reservation.

A sector for read only indicates a sector of the case where a data section is fabricated by embossment actually like a lead-in area portion. A first sector is a sector where switch-over in tracking polarity from land to groove or vice versa is performed. The last sector indicates a sector ahead of the first sector by one sector.

Further description will be given with use of the example of FIG. 5. Sectors indicated with sector addresses 30000h, 30011h, 30022h, 30033h, . . . are writable first sectors. Sectors indicated with sector addresses 30010h, 30021h, 30032h, 30043h, . . . are writable last sectors. Besides, sectors indicated with sector addresses 3000Eh, 30020h, 30031h, 30042h, 10 are writable sectors ahead of the last sector by one sector.

Timing for a writable first sector to be required for tracking polarity switch-over can be generated from sector type bits which are a portion indicating a sector type. That is, a sector type is determined by reading the PID section in a header and a tracking polarity is or is not switched over to the other based on the determined sector type. Even when the first sector is not detected, switch-over timing is generated from a last sector ahead of the sector by one sector, or a writable sector ahead of the last sector by one sector, which makes it possible to conduct switch-over.

In detection of a first section in concert with timing detection in tracking polarity switch-over, an IED section of 2 bytes is additionally provided as shown in FIG. 3B, thereby facilitating error detection. Therefore, a rewritable first sector can be detected with high reliability and tracking polarity switch-over on a single spiral disk can be realized in a stable manner.

If a PID section comprising PID 1 and PID 2 is grouped as a first half PID section and a PID section comprising PID 3 and PID 4 is grouped as a second half PID section and a sector address values recorded in the first and second PID sections are compared with each other, a result from the comparison can be utilized for tracking polarity switch-over.

That is, a first half header section for the (30000h) groove sector recording section is the (30011h) header section and a second half header section therefor is the (30000h) header section. The (30011h) header section of the first half header section is provided with the first half PID section in which the sector address 30011h is recorded. The (30000h) header section of the second half header section is provided with the second half PID section in which the sector address 30000h is recorded.

The sector address 30011h recorded in the first half PID section is larger in value than the sector address 30000h recorded in the second half PID section. This relation is effective for all the groove sectors having the structure shown in FIG. 5. Therefore, when a header section is illuminated with a light beam, sector addresses in the first half PID section and in the second half PID section are read. The sector address in the first half PID section is larger in comparison of sector address value. Thus, a recording section which is subsequently illuminated can be judged as the recording section of a groove sector, which in turn can be used for tracking polarity switch-over.

A similarity can be met in the case of a land sector. For example, a first half header section for the (30011h) land sector recording section is the (30011h) header section and a second half header section therefor is the (30022h) header section. The (30011h) header section of the first half header section is provided with the first half PID section in which the sector address 30011h is recorded. The (30022h) header section of the second half header section is provided with the second half PID section in which the sector address 30022h is recorded.

The sector address 30011h recorded in the first half PID section is smaller in value than the sector address 30022h recorded in the second half PID section. This relation is effective for all the land sectors having the structure shown in FIG. 5. Therefore, when a header section is illuminated with a light beam, sector addresses in the first half PID section and in the second half PID section are read. The sector address in the first half PID section is smaller in comparison of sector address values. Thus, a recording section which is subsequently illuminated can be judged as the recording section of a land sector, which in turn can be used for tracking polarity switch-over.

Described will be the case where, at this point, the above mentioned switch-over of a tracking polarity is not performed in an orderly manner, or the switch-over is intentionally not conducted, and an automatic track-hold is effected in a track.

For example, in the first sector shown in FIG. 5, when tracing with a light beam is conducted from the (30021h) land sector recording section to the (30022h) groove sector recording section, the track center of a land track is traced normally with the spot of the light beam in the (30021h) land sector recording section as described above. Tracking with the light beam is conducted along the center line between header sections in a zig-zag shifted configuration comprising the (30033h) header section and the (30022h) header section. In the (30022h) groove sector recording section, a tracking polarity is first switched from land to groove and thereafter, the track center of a groove track is traced with the light beam spot.

At this point, if a tracking polarity cannot still be switched over from land to groove after the light spot traveled through the header sections in a zig-zag shifted configuration, track control is effected so that the light beam spot traces any of the (30011h) land sector recording section and the (30033h) land sector recording section and a normal track follow-up condition cannot be held any more. At this point, it is unforeseeable to which section the light spot is track-controlled since there are various factors such as then eccentricity of the disk, a track offset condition and the like which are influential.

Accordingly, when a light beam spot traces the track, a track offset is provided which has a magnitude of the order to prevent deterioration recording/reproducing characteristics. That is, a light beam spot traces track centers of a land track and a groove track with a small deviation from a center toward the inner side of a disk when the light beam spot traces the land tracks and the groove tracks in the shape of a spiral from the inner side to the outer side.

In such a situation, if a tracking polarity is not switched over as described above, tracking control is effected from the. (30021h) land sector recording section to the (30011h) land sector recording section through the zig-zag shift headers. After the tracking control, the light beam begins to trace a land track of one round from the (30011h) land sector recording section and returns back to the (30021h) land sector recording section.

Therefore, if a small track offset with a magnitude of the order which does not adversely affect the recording/reproducing characteristics is intentionally provided toward the inner side of the disk, the light beam spot can be made to trace while being held on the same track in the tracing order of 30011h, 30012h, 30020h, 30021h, 30011h, and when tracking polarity switch-over is not conducted or even when tracking polarity switch-over is not satisfactorily conducted, a large deviation from a normal tracking control can be prevented form occurring.

In FIG. 5, an emboss data area is shown in a place, toward the inner side, spaced from the rewritable data area with the zig-zag shift header configuration described above. The emboss data area is a data area for read only, and is not of a sector format having a rewritable zig-zag shift header configuration but data are recorded in the sector format for a read-only disk. In the emboss data area, data are recorded with embossment comprising pits in a recess/protrusion profile. A coupling area comprising a mirror is provided in a space between the emboss data area and the rewritable data area.

In such an emboss area, for example, a reference signal, physical format information, disk fabrication information, disk supplier information and the like are recorded and the area is used as a lead-in area which can be read for information retrieval by a read-only player conventionally used. With such a provision, disk identification can be effected with ease by a conventional read-only player even when information recorded in a sector format with zig-zag shift headers cannot be read out by the player.

It is preferred in an optical disk of a land/groove recording type with a zig-zag shift header section that a so-called zoned CLV format or a so-called zoned CAV format can be used to serve a double purpose.

That is, by adopting a single spiral structure having a zig-zag shift header section, information can be recorded on a land and in a groove, as described above, and a recording capacity thereby is increased. Thus, short access times can be realized across the entire disk surface. On the other hand, a zoned CLV format or a zoned CAV format is suitable for high speed access since rotational speed of a spindle motor can be simplified. Therefore, if zoned CLV format or the zoned CAV format is used in combination with a single spiral structure having the above described zig-zag shift header section, further improvement to access speeds can be realized.

Figure 6:
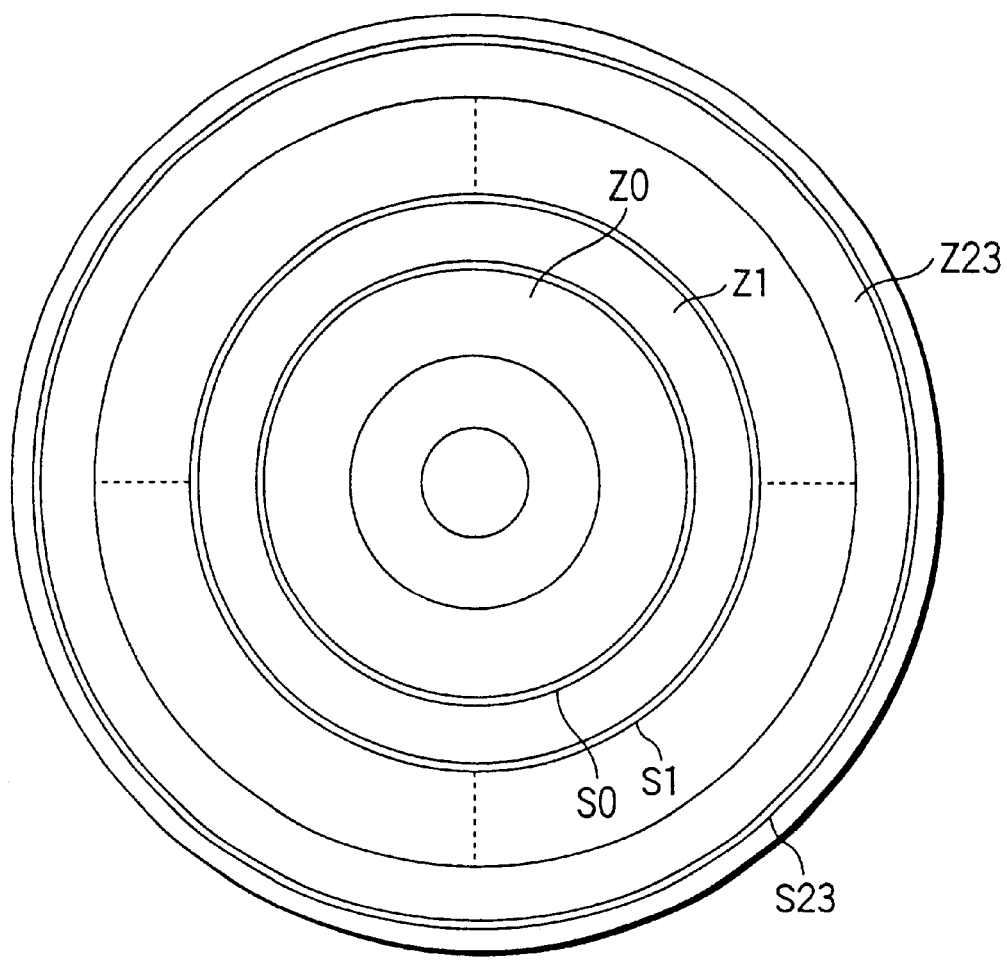
FIG. 6 is a view as a model showing a format, in which a plurality of annular zones partitioned are provided, of an recording/reproducing optical disk pertaining to an embodiment of the present invention.
Figure 7:
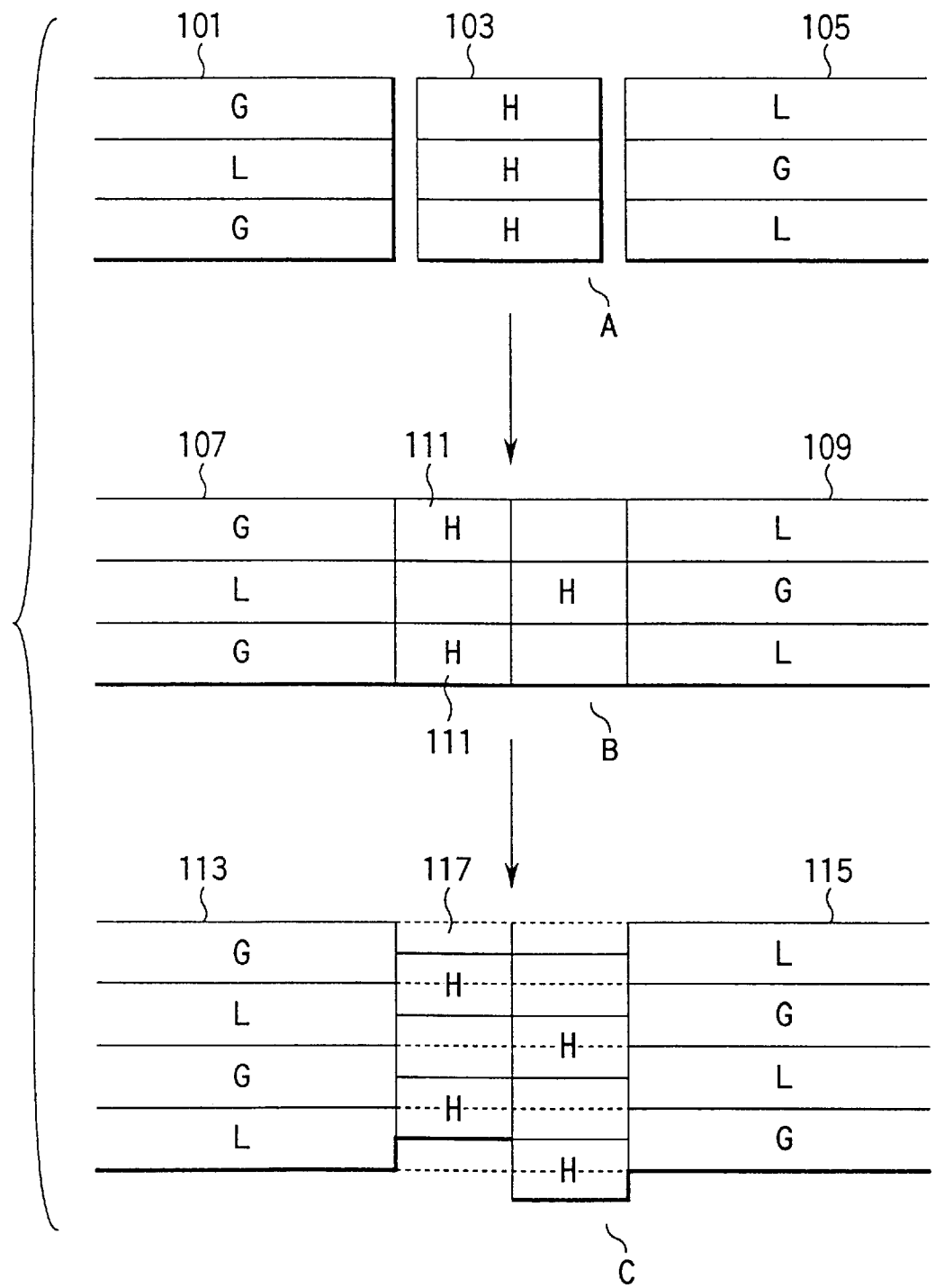
FIG. 7 illustrates stages of development in creation of the present invention.

As shown in FIG. 6, for example, in a zoned CLV format, the surface of an optical disk is divided into a plurality of annular zones Z 0, Z 1, . . . , Z 23. Information is recorded in the sector format of a single spiral structure with a zig-zag shift header section in each divided zone. A linear speed on the disk surface is kept at a constant value in each divided annular zone while changing a disk rotational speed. Since it is easy to conduct information reading at a near constant linear speed by variable speed control for disk rotation with comparative simplicity in which a disk rotation speed is controlled at a constant value in each zone, high speed access can be realized.

However, when recording/reproducing are performed on an optical disk from a zone to a zone, a necessity arises for a change in rotational speed of the spindle motor. For example, if there is a sector where information cannot be reproduced due to presence of a defect on a recording surface in a zone and no spare area (that is, alternate area) is available where information to be recorded in the sector as an alternate, recording/reproducing over both adjacent zones on the disk must be conducted to change the rotational speed of the spindle motor.

A change in the rotational speed of a motor requires a long time until the changed rotational speed becomes stabilized. Thus, data access times are longer. A spare area is provided in each zone in order to eliminate such a harmful effect. For example, in the 24 divided zones described above, that is in Z 0, Z 1, . . . , Z 23, spare areas S 0, S 1, . . . , S 23 are provided along the outside of each respective zone.

TABLE 1

| Zone number | Sectors number | Head sectors number (HEX) | Inner side buffer area sectors number (HEX) | Data area number (HEX) | Data block number | Spare sector number (HEX) |
| --- | --- | --- | --- | --- | --- | --- |
| 0 | 17 | 31000 | — | 31000 to 377DF | 1662 | 377E0 to 37D2F |
| 1 | 18 | 37D60 | 37D60 to 37D8F | 37090 to 3FB2F | 2010 | 3FB30 to 401EF |
| 2 | 19 | 40220 | 40220 to 4024F | 40250 to 486EF | 2122 | 486D0 to 48E0F |
| 3 | 20 | 48E40 | 48E40 to 48F6F | 48E70 to 51ADF | 2234 | 51A10 to 5218F |
| 4 | 21 | 521C0 | 521C0 to 521EF | 52 F0 to 5B48F | 2346 | 5B490 to 5BC6F |
| 5 | 22 | 58CA0 | 58CA0 to 58CCF | 58CD0 to 6566F | 2458 | 65670 to 65EAF |
| 6 | 23 | 65EE0 | 65E10 to 6540F | 65F10 to 6FFAF | 2570 | 61FB0 to 7084F |
| 7 | 24 | 70880 | 70880 to 708AF | 708B0 to 7B04F | 2882 | 78050 to 7894F |
| 8 | 5 | 78980 | 78980 to 7898F | 789C0 to 8683F | 2792 | 86840 to 8719F |
| 9 | 26 | 871E0 | 871E0 to 8721F | 87220 to 9279F | 2904 | 927A0 to 9315F |
| 10 | 27 | 931A0 | 931A0 to 931DF | 931E0 to 9EE5F | 3016 | 9EE60 to 9F87F |
| 11 | 28 | 9F8C0 | 9F8C0 to 9F8FF | 9F9D0 to ABC7F | 3128 | ABC80 to AC6FF |
| 12 | 29 | AC740 | AC740 to AC77F | AC780 to B91FF | 3240 | B9200 to B9CDF |

| Zone number | Quantity of spare sector | Number of sector of outer side buffer area (HEX) | Final sector number (HEX) | LBA head sector | Number of data area of head sector (HEX) |
| --- | --- | --- | --- | --- | --- |
| 0 | 1360 | 37D30 to 37D5F | 37D5F | 0 | 31000 |
| 1 | 1728 | 401F0 to 4021F | 4021F | 26592 | 377E0 |
| 2 | 1824 | 48E10 to 48E3F | 48E3F | 58752 | 3F580 |
| 3 | 1920 | 52190 to 5218F | 521BF | 92704 | 47A20 |
| 4 | 2016 | 5BC70 to 58C9F | 58C9F | 128448 | 505C0 |
| 5 | 2112 | 65EB0 to 65EDF | 65EDF | 165984 | 59860 |
| 6 | 2208 | 70850 to 70871 | 7087F | 205312 | 63200 |
| 7 | 2304 | 7B950 to 7B97F | 7897F | 246432 | 6D2A0 |
| 8 | 2400 | 871A0 to 871DF | 871DF | 289344 | 77A40 |
| 9 | 2496 | 93160 to 9319F | 9319F | 334016 | 828C0 |
| 10 | 2592 | 9F880 to 9F88F | 9F8BF | 380480 | 8DE40 |
| 11 | 2688 | AC700 to AC73F | AC73F | 428736 | 99AC0 |
| 12 | 2784 | B9CE0 to B9D1F | B9D1F | 478784 | A5E40 |

TABLE 1-continued

| Zone number | Sectors number | Head sectors number (HEX) | Inner side buffer area sectors number (HEX) | Data area number (HEX) | Data block number | Spare sector number (HEX) |
|---|---|---|---|---|---|---|
| 13 | 30 | 89D20 | 89D20 to 89D5F | B9D50 to C6EDF | 3352 | C6EE0 to C7A1F |
| 14 | 31 | C7A60 | C7A60 to C7A91 | C7AA0 to D531F | 3464 | D5320 to D5EBF |
| 15 | 32 | D5F00 | D5F00 to D5F3F | D5F40 to E3EBF | 3576 | E3EC0 to E4ABF |
| 16 | 33 | E4B00 | E4B00 to E4B4F | E4850 to F31AF | 3686 | F31B0 to F3E0F |
| 17 | 34 | F3E60 | F3E60 to F3EAF | F3E80 to 102C0F | 3798 | 102C10 to 1038CF |
| 18 | 35 | 103920 | 103920 to 10396F | 103970 to 112DCF | 3910 | 112DD0 to 113AEF |
| 19 | 36 | 113B40 | 113B40 to 11398F | 113890 to 1238EF | 4022 | 1236F0 to 12448F |
| 20 | 37 | 1244C0 | 1244C0 to 12450F | 124510 to 13478F | 4134 | 134770 to 13554F |
| 21 | 38 | 1355A0 | 1355A0 to 1355EF | 1355F0 to 145F4F | 4246 | 145F50 to 148D8F |
| 22 | 39 | 146DE0 | 146DE0 to 146E2F | 146E30 to 157E8F | 4358 | 157E90 to 158D2F |
| 23 | 40 | 15BD80 | 158D80 to 158DCF | 148DD0 to 16A57F | 4475 | 16A580 to 16B47F |
| Total | | | | | 76185 | |

| Zone number | Quantity of spare sector | Number of sector of outer side buffer area (HEX) | Final sector number (HEX) | LBA head sector | Number of data area of head sector (HEX) |
|---|---|---|---|---|---|
| 13 | 2880 | C7A20 to C7A5F | C7A5F | 530624 | B20C0 |
| 14 | 2976 | D5EC0 to D5EFF | D5EFF | 584256 | BFA40 |
| 15 | 3072 | E4AC0 to E4AFF | E4AFF | 639880 | CD2C0 |
| 16 | 3168 | F3E10 to F3E5F | F3E5F | 696896 | DB240 |
| 17 | 3264 | 1038D0 to 10391F | 10391F | 755872 | E98A0 |
| 18 | 3360 | 113AF0 to 113B3F | 113B3F | 816640 | F8600 |
| 19 | 3458 | 124470 to 1244BF | 12448F | 879200 | 107A60 |
| 20 | 3552 | 135550 to 13559F | 13559F | 943552 | 1175C0 |
| 21 | 3648 | 146D90 to 146D0F | 148DDF | 1009696 | 127820 |
| 22 | 3744 | 158D30 to 158D7F | 158D7F | 1077632 | 138180 |
| 23 | 3840 | — | 16847F | 1147360 | 1491E0 |
| Total | 65392 | | | | |

In Table 1, the zone numbers 0, 1, . . . , 23 corresponds to the zones Z 0, Z 1, . . . , Z 23 respectively and data for the zones are shown.

The sector numbers each show the number of sectors on one track round and an increment in the number is one in a next zone to the outer side. The start sector numbers each show the sector number of a start sector of each zone, that is a representation of a sector address in the hexadecimal notation. An inside buffer area sector number shows a sector number of a buffer area provided in the inner side of each zone. The buffer area is an area provided in an interface between zones and no data recording is conducted there. The sector numbers of the data area show sector numbers of areas where user data recording can be effected. Calculation of a disk capacity is to sum up data quantities of areas of this kind. The data block numbers which are expressed in the decimal notation, and which show how many ECC blocks (16 physical sectors) can be included in the areas where the user data recording can be effected.

The spare sector numbers each are sector numbers of spare sectors, which are expressed in the hexadecimal notation, and which are included in the spare area of a zone. As can be seen from Table 1, a sector with a larger sector number is located at an outer position in an optical disk and thus, the spare area described above each are disposed in the outer side of a zone. The numbers of spare sectors each are the number of spare sectors expressed in the decimal notation.

The sector numbers of the outer side buffer areas each show sector numbers of a buffer area which are disposed in the outer side of a zone. The end sector numbers each are the end sector number of a zone expressed in the hexadecimal notation. The LBA start sector numbers, which are expressed in the decimal notation, shows the start number of a logic block address (that is, the sectors other than the buffer areas and the spare areas are numbered with a series of numbers wherein a first number is directly followed by a second number which is larger or smaller than the first number by 1). The data area number of the start sectors each show a number, which is expressed in the hexadecimal notation, and which is offset from a LBA start sector number by 31000h in the hexadecimal notation, that is obtained by adding to the LBA start sector number with 200704 in the decimal notation.

As described above, in the embodiments of the invention of the present application, a spare area is provided for each zone and the switch-over can be performed without any change in disk rotational speed, whereby a shorter time in data access can be realized. As a preferred example in regard to the data shown in Table 1, there is a structure that each zone comprises 1888 tracks. In this case, no change in disk rotational speed is required in switch-over and all that is required is only to conduct a seek over the maximum of 1888 tracks.

As described above, according to the present invention, the first half header section (HF1, HF3) and the second half header section (HF2, HF4) are spatially disposed alternately in a zig-zag shifted configuration as shown FIG. 1A. This technique provides at least the following advantages 1) reliability in reading is improved by providing a margin in distance between adjacent pits; 2) speedy cutting is realized by use of only one beam without use of a finer beam exclusively used for a header; and 3) switch-over between a land and a groove can be detected with ease. Thereby, a disk with high reliability in data recording/reproducing can be provided. In addition, provided is a recording/reproducing optical disk recording/reproducing apparatus, in which data recording/reproducing is effected on the optical disk which exercises the above described operations and effects with precision and a high speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data recording/reproducing optical disk comprising:
   a spiral track spirally formed on a disk;
   a land portion and a groove portion alternately formed on the spiral track wherein the land and groove portions are alternated in successive rounds of the spiral track;
   a first recording section formed on the land portion on the spiral track and configured for recording/reproducing data;
   a second recording section formed on the groove portion on the spiral track and configured for recording/reproducing data;
   a first half header section formed on the spiral track and positioned adjacent to the first recording section, the first recording section having a first predetermined address (m−1) which precedes a second predetermined address (m) by one address location, the first half header section being shifted radially outward relative to the first recording section, and storing an address (m+N) which is different from the second predetermined address (m) by one rotation of a track; and
   a second half header section formed on the spiral track and positioned adjacent to the second recording section, the second half header section being shifted radially inward relative to the first half header section in a zigzag manner, and storing the second predetermined address (m).

2. A data recording/reproducing optical disk apparatus configured for recording/reproducing data on an optical disk including:
   a spiral track spirally formed on a disk;
   a land portion and groove portion alternately formed on the spiral track, wherein the land and groove portions are alternated in successive rounds of the spiral track;
   a first recording section formed on the land portion on the spiral track and configured for recording/reproducing data;
   a second recording section formed on the groove portion on the spiral track and configured for recording/reproducing data;
   a first half header section formed on the spiral track and positioned adjacent to the first recording section the first recording section having a first predetermined address (m−1) which precedes a second predetermined address (m) by one address location, the first half header section being shifted radially outward relative to the first recording section, and storing an address (m+N) which is different from the second predetermined address (m) by one rotation of a track; and
   a second half header section formed on the spiral track and positioned adjacent to the second recording section, the second half header section being shifted radially inward relative to the first half header section in a zigzag manner, and storing the second predetermined address (m) wherein the apparatus comprises:
   a light illuminating means configured for producing a light beam in order to illumination the first half header section, the second half header section, the first recording section, and the second recording section;
   control means for controlling an illuminating position of the light beam based upon a change in characteristics of reflected light of the light beam in order to direct the light beam to a predetermined position on the optical disk; and
   a data recording/reproducing means for detecting a switch-over position between the first recording section and the second recording section based upon light reflected from the first half header section and the second half header section produced from illumination thereof by the reflected light and executing data recording/reproducing on the optical disk based upon detection of the switch-over position.

3. The data recording/reproducing optical disk apparatus of claim 2, wherein the control means includes means for controlling a spot of the light beam so that the light beam is directed to a position deviated by a predetermined distance toward the inner side of the optical disk from the center of the spiral tracks when the spot of the light beam traces the spiral tracks.

4. A data recording/reproducing optical disk reproducing apparatus configured for recording/reproducing data on an optical disk including:
   a spiral track spirally formed on a disk;
   a land portion and groove portion alternately formed on the spiral track, wherein the land and groove portions are alternated in successive rounds of the spiral track;
   a first recording section formed on the land portion on the spiral track and configured for recording/reproducing data;
   a second recording section formed on the groove portion on the spiral track and configured for recording/reproducing data;
   a first half header section formed on the spiral track and positioned adjacent to the first recording section the first recording section having a first predetermined address (m−1) which precedes a second predetermined address (m) by one address location, the first half header section being shifted radially outward relative to the first recording section, and storing an address (m+N) which is different from the second predetermined address (m) by one rotation of a track; and
   a second half header section formed on the spiral track and positioned adjacent to the second recording section, the second half header section being shifted radially inward relative to the first half header section in a zigzag manner, and storing the second predetermined address (m) wherein the apparatus comprises:
   a light illuminating means configured for producing a light beam in order to illuminate a first half header section, a second half header section, a first recording section, and a second recording section;
   control means for controlling an illuminating position of the light beam based upon a change in characteristics of reflected light of the light beam in order to direct the light beam to a predetermined position on the optical disk; and
   a data reproducing means for detecting a switch-over position between the first recording section and the second recording section based upon light reflected from the first half header section and the second half header section produced from illumination thereof by the reflected light and executing data reproducing on the optical disk based upon detection of the switch-over position.

5. The data recording/reproducing optical disk reproducing apparatus according to claim 4, wherein the control means includes means for controlling a spot of the light beam so that the light beam is directed to a position deviated by a predetermined distance radially inward from the center of the spiral track when the spot of the light beam traces the spiral tracks.

6. A data recording/reproducing optical disk comprising:

a spiral track spirally formed on a disk;

a land portion and groove portion alternately formed on the spiral track, wherein the land and groove portions are alternated in successive rounds of the spiral track;

a first recording section formed on the land portion on the spiral track and configured for recording/reproducing data;

a second recording section formed on the groove portion on the spiral track and configured for recording/reproducing data;

a first half header section including first and second headers, said first header formed on the spiral track and positioned adjacent to the first recording section, the first recording section having a first predetermined address (m−1) which precedes a second predetermined address (m) by one address location, the first header being shifted radially outward relative to the first recording section and stores an address (m+N) which is different from the second predetermined address (m) by one rotation of a track, the second a header containing the same information as the first header, and which is located adjacent thereto; and a second half header section including third and fourth headers, said third header formed on the spiral track and positioned adjacent to the second recording section, the third header being shifted radially inwardly relative to the first header in a zigzag manner, and storing the second predetermined address (m), the fourth header containing the same information as the third header, and which is located adjacent thereto.

7. A data recording/reproducing optical disk apparatus configured for recording/reproducing data on an optical disk including:

a spiral track spirally formed on a disk;

a land portion and groove portion alternately formed on the spiral track, wherein the land and groove portions are alternated in successive rounds of the spiral track;

a first recording section including first and second headers, said first header formed on the land portion on the spiral track and configured for recopying/reproducing data;

a second recording section formed on the groove portion on the spiral track and configured for recording/reproducing data;

a first half header section, including first and second headers, said first header formed on the spiral track and positioned adjacent to the first recording section the first recording section having a first predetermined address (m−1) which precedes a second predetermined address (m) by one address location, the first header being shifted radially outward relative to the first recording section, and storing an address (m+N) which is different from the second predetermined address (m) by one rotation of a track, the second header containing the same information as the first header and which is located adjacent thereto; and a second half header section including third and fourth headers, the third header formed on the spiral track and positioned adjacent to the second recording section, the third header being shifted radially inward relative to the first header in a zigzag manner, and storing the second predetermined address (m), the fourth header containing the same information as the third header, and which is located adjacent thereto, wherein the apparatus comprises:

a light illuminating means configured for producing a light beam in order to illuminate the first half header section, the second half header section, the first recording section, and the second recording section;

control means for controlling an illuminating position of the light beam based upon a change in characteristics of reflected light of the light beam in order to direct the light beam to a predetermined position on the optical disk; and a data recording/reproducing means for detecting switch-over position between the first recording section and the second recording section based upon light reflected from the first half header section and the second half header section produced from illumination thereof by the reflected light and executing data recording/reproducing on the optical disk based upon detection of the switch-over position.

8. The data recording/reproducing optical disk apparatus of claim 7, wherein the control means includes means for controlling a spot of the light beam so that the light beam is directed to a position deviated by a predetermined distance toward the inner side of the optical disk from the center of the spiral tracks when the spot of the light beam traces the spiral tracks.

9. A data recording/reproducing optical disk reproducing apparatus configured for recording/reproducing data on an optical disk including:

a spiral track spirally formed on a disk;

a land portion and groove portion alternately formed on the spiral track, wherein the land and groove portions are alternated in successive rounds of the spiral track;

a first recording section including first and second headers, said first header formed on the land portion on the spiral track and configured for recording/reproducing data;

a second recording section formed on the groove portion on the spiral track and configured for recording/reproducing data;

a first half header section, including first and second headers, said first header formed on the spiral track and positioned adjacent to the first recording section the first recording section having a first predetermined address (m−1) which precedes a second predetermined address (m) by one address location, the first header being shifted radially outward relative to the first recording section, and storing an address (m+N) which is different from the second predetermined address (m) by one rotation of a track, the second header containing the same information as the first header and which is located adjacent thereto; and a second half header section including third and fourth headers, the third header formed on the spiral track and positioned adjacent to the second recording section, the third header being shifted radially inward relative to the first header in a zigzag manner, and storing the second predetermined address (m), the fourth header containing the same information as the third header, and which is located adjacent thereto, wherein the apparatus comprises:

a light illuminating means configured for producing a light beam in order to illuminate a first half header section having first and second headers, a second half header section having third and fourth headers, a first recording section, and a second recording section, the first and second headers containing the same information and being located adjacent to each other, the third and fourth headers containing the same information being adjacent to each other;

control means for controlling an illuminating position of the light beam based upon a change in characteristics of reflected light of the light beam in order to direct the light beam to a predetermined position on the optical disk; and a data reproducing means for detecting a switch-over position between the first recording section and the second recording section based upon light reflected from the first half header section and the second half header section produced from illumination thereof by the reflected light and executing data reproducing on the optical disk based upon detection of the switch-over position.

10. The data recording/reproducing optical disk reproducing apparatus of claim 9, wherein the control means includes means for controlling a spot of the light beam so that the light beam is directed to a position deviated by a predetermined distance radially inward from the center of the spiral track when the spot of the light beam traces the spiral tracks.

11. A data recording/reproducing optical disk comprising:

a spiral track spirally formed on a disk;

a land portion and groove portion alternately formed on the spiral track, wherein the land and groove portions are alternated in successive rounds of the spiral track;

a first recording section formed on the land portion on the spiral track and configured for recording/reproducing data;

a second recording section formed on the groove portion on the spiral track and configured for recording/reproducing data;

a first half header section formed on the spiral track and positioned adjacent to the first recording section, the first recording section having a first predetermined address (m−1) which precedes a second predetermined address (m) by one address location, the first half header section being shifted radially outward relative to the first recording section, and storing an address (m+N) which is different from the second predetermined address (m) by one rotation of a track; and a second half header section formed on the spiral track and positioned adjacent to the second recording section via a mirror field, the second half header section being shifted radially inward relative to the first half header section in a zigzag manner, and storing the second predetermined address (m).

12. A data recording/reproducing optical disk apparatus configured for recording/reproducing data on an optical disk including:

a spiral track spirally formed on a disk;

a land portion and groove portion alternately formed on the spiral track, wherein the land and groove portions are alternated in successive rounds of the spiral track;

a first recording section formed on the land portion on the spiral track and configured for recording/reproducing data;

a second recording section formed on the groove portion on the spiral track and configured for recording/reproducing data;

a first half header section formed on the spiral track and positioned adjacent to the first recording section the first recording section having a first predetermined address (m−1) which precedes a second predetermined address (m) by one address location, the first half header section being shifted radially outward relative to the first recording section, and storing an address (m+N) which is different from the second predetermined address (m) by one rotation of a track; and a second half header section formed on the spiral track and positioned adjacent to the second recording section via a mirror field, the second half header section being shifted radially inward relative to the first half header section in a zigzag manner, and storing the second predetermined address (m) wherein the apparatus comprises:

a light illuminating means configured for producing a light beam in order to illuminate the first half header section, the second half header section, the first recording section, and the second recording section;

control means for controlling an illuminating position of the light beam based upon a change in characteristics of reflected light of the light beam in order to direct the light beam to a predetermined position on the optical disk; and a data recording/reproducing means for detecting switch-over position between the first recording section and the second recording section based upon light reflected from the first half header section and the second half header section produced from illumination thereof by the reflected light and executing data recording/reproducing on the optical disk based upon detection of the switch-over position.

13. The data recording/reproducing optical disk apparatus of claim 12, wherein the control means includes means for controlling a spot of the light beam so that the light beam is directed to a position deviated by a predetermined distance toward the inner side of the optical disk from the center of the spiral tracks when the spot of the light beam traces the spiral tracks.

14. A data recording/reproducing optical disk reproducing apparatus configured for recording/reproducing data on an optical disk including:

a spiral track spirally formed on a disk;

a land portion and groove portion alternately formed on the spiral track, wherein the land and groove portions are alternated in successive rounds of the spiral track;

a first recording section formed on the land portion on the spiral track and configured for recording/reproducing data;

a second recording section formed on the groove portion on the spiral track and configured for recording/reproducing data;

a first half header section formed on the spiral track and positioned adjacent to the first recording section the first recording section having a first predetermined address (m−1) which precedes a second predetermined address (m) by one address location, the first half header section being shifted radially outward relative to the first recording section, and storing an address (m+N) which is different from the second predetermined address (m) by one rotation of a track; and a second half header section formed on the spiral track and positioned adjacent to the second recording section via a mirror field, the second half header section being shifted radially inward relative to the first half header section in a zigzag manner, and storing the second predetermined address (m) wherein the apparatus comprises:

a light illuminating means configured for producing a light beam in order to illuminate a first half header section, a second half header section, a first recording section, and a second recording section, the first half header section formed adjacent to the first recording section and the second half header section formed adjacent to the second recording section via a mirror field;

control means for controlling an illuminating position of the light beam based upon a change in characteristics of reflected light of the light beam in order to direct the light beam to a predetermined position on the optical disk; and a data reproducing means for detecting a switch-over position between the first recording section and the second recording section based upon light reflected from the first half header section and the second half header section produced from illumination thereof by the reflected light and executing data reproducing on the optical disk based upon detection of the switch-over position.

15. The data recording/reproducing optical disk reproducing apparatus of claim 14, wherein the control means includes means for controlling a spot of the light beam so that the light beam is directed to a position deviated by a predetermined distance radially inward from the center of the spiral track when the spot of the light beam traces the spiral tracks.

16. A data recording/reproducing optical disk comprising:

a spiral track spirally formed on a disk;

a land portion and groove portion alternately formed on the spiral track, wherein the land and groove portions alternate in successive rounds of the spiral track;

a first recording section formed on the land portion on the spiral track and configured for recording/reproducing data;

a second recording section formed on the groove portion on the spiral track and configured for recording/reproducing data;

a first half header section including first and second headers, said first header formed on the spiral track and position adjacent to the first recording section, the first recording section having a first predetermined address (m−1) which precedes a second predetermined address (m) by one address location, the first header being shifted radially outward relative to the first recording section, and storing an address (m+N) which is different from the second predetermined address (m) by one rotation of a track, the second header containing the same information as the first header, and which is located adjacent thereto in a forward direction of the disk, the first header containing VFO information which is longer in data length than that of the second header; and a second half header section including third and fourth headers, said third header formed on the spiral track and positioned adjacent to the second recording section, the third header being shifted radially inward relative to the first header in a zigzag manner, and stores the second predetermined address (m), the fourth header containing the same information as the third header, and which is located adjacent thereto in a forward direction of the disk, the third header containing VFO information which is longer in data length than that of the fourth header.

17. A data recording/reproducing optical disk apparatus configured for recording/reproducing data on an optical disk including:

a spiral track spirally formed on a disk;

a land portion and groove portion alternately formed on the spiral track, wherein the land and groove portions are alternated in successive rounds of the spiral track;

a first recording section formed on the land portion on the spiral track and configured for recording/reproducing data;

a second recording section formed on the groove portion on the spiral track and configured for recording/reproducing data;

a first half header section including first and second headers, the first header formed on the spiral track and positioned adjacent to the first recording section the first recording section having a first predetermined address (m−1) which precedes a second predetermined address (m) by one address location, the first half header section being shifted radially outward relative to the first recording section, and storing an address (m+N) which is different from the second predetermined address (m) by one rotation of a track, the second header containing the same information as the first header, and which is located adjacent thereto in a forward direction of the disk, the first header containing VFO information which is longer in data length than that of the second header section; and a second half header section including third and fourth headers, the third header formed on the spiral track and positioned adjacent to the second recording section, the third header being shifted radially inward relative to the first header in a zigzag manner, and stores the second predetermined address (m), the fourth header containing the same information as the third header, and which is located adjacent thereto in the forward direction of the disk, the third header containing VFO information which is longer in data length than that of the fourth header, wherein the apparatus comprises:

a light illuminating means configured for producing a light beam in order to illuminate the first half header section, the second half header section, the first recording section, and the second recording section;

control means for controlling an illuminating position of the light beam based upon a change in characteristics of reflected light of the light beam in order to direct the light beam to a predetermined position on the optical disk; and a data recording/reproducing means for detecting switch-over position between the first recording section and the second recording section based upon light reflected from the first half header section and the second half header section produced from illumination thereof by the reflected light and executing data recording/reproducing on the optical disk based upon detection of the switch-over position.

18. The data recording/reproducing optical disk apparatus of claim 17, wherein the control means includes means for controlling a spot of the light beam so that the light beam is directed to a position deviated by a predetermined distance toward the inner side of the optical disk from the center of the spiral tracks when the spot of the light beam traces the spiral tracks.

19. A data recording/reproducing optical disk reproducing apparatus configured for recording/reproducing data on an optical disk including:

a spiral track spirally formed on a disk;

a land portion and groove portion alternately formed on the spiral track, wherein the land and groove portions are alternated in successive rounds of the spiral track;

a first recording section formed on the land portion on the spiral track and configured for recording/reproducing data;

a second recording section formed on the groove portion on the spiral track and configured for recording/reproducing data;

a first half header section including first and second headers, the first header formed on the spiral track and positioned adjacent to the first recording section the first recording section having a first predetermined address (m−1) which precedes a second predetermined address (m) by one address location, the first half header section being shifted radially outward relative to the first recording section, and storing an address (m+N) which is different from the second predetermined address (m) by one rotation of a track, the second header containing the same information as the first header, and which is located adjacent thereto in a forward direction of the disk, the first header containing VFO information which is longer in data length than that of the second header section; and a second half header section including third and fourth headers, the third header formed on the spiral track and positioned adjacent to the second recording section, the third header being shifted radially inward relative to the first header in a zigzag manner, and stores the second predetermined address (m), the fourth header containing the same information as the third header, and which is located adjacent thereto in the forward direction of the disk, the third header containing VFO information which is longer in data length than that of the fourth header, wherein the apparatus comprises:

a light illuminating means configured for producing a light beam in order to illuminate a first half header section having first and second headers, a second half header section having third and fourth headers, a first recording section, and a second recording section, the first and second headers containing the same information and being located adjacent to each other, the first header containing VFO information which is longer in data length than that of the second header, the third and fourth headers containing the same information being created adjacent to each other, the third header containing VFO information which is longer in data length than that of the fourth header;

control means for controlling an illuminating position of the light beam based upon a change in characteristics of reflected light of the light beam in order to direct the light beam to a predetermined position on the optical disk; and a data reproducing means for detecting a switch-over position between the first recording section and the second recording section based upon light reflected from the first half header section and the second half header section produced from illumination thereof by the reflected light and executing data reproducing on the optical disk based upon detection of the switch-over position.

20. The data recording/reproducing optical disk reproducing apparatus of claim 19, wherein the control means includes means for controlling a spot of the light beam so that the light beam is directed to a position deviated by a predetermined distance radially inward from the center of the spiral track when the spot of the light beam traces the spiral tracks.

* * * * *